United States Patent
Takekawa et al.

(10) Patent No.: US 10,070,406 B2
(45) Date of Patent: Sep. 4, 2018

(54) METHOD FOR ADJUSTING TRANSMISSION TIMING IN MULTIPLE ACCESS SYSTEM

(71) Applicant: Hltachi Kokusai Electric Inc., Chiyoda-ku, Tokyo (JP)

(72) Inventors: Masayuki Takekawa, Tokyo (JP); Keigo Hasegawa, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 92 days.

(21) Appl. No.: 15/270,223

(22) Filed: Sep. 20, 2016

(65) Prior Publication Data
US 2017/0013582 A1    Jan. 12, 2017

Related U.S. Application Data

(63) Continuation-in-part of application No. PCT/JP2015/058086, filed on Mar. 18, 2015.

(30) Foreign Application Priority Data

Apr. 16, 2014  (JP) .................................. 2014-084210

(51) Int. Cl.
*H04W 56/00* (2009.01)
*H04W 4/02* (2018.01)
(Continued)

(52) U.S. Cl.
CPC ....... *H04W 56/0045* (2013.01); *H04W 4/023* (2013.01); *H04B 17/336* (2015.01);
(Continued)

(58) Field of Classification Search
CPC ........... H04W 52/241; H04W 56/0045; H04W 56/001; H04W 72/0446; H04L 27/2655;
(Continued)

(56) References Cited

U.S. PATENT DOCUMENTS 8,446,970 B2   5/2013  Asjadi
8,588,087 B2  11/2013  Jiao et al.
(Continued)

FOREIGN PATENT DOCUMENTS

JP       11-163767 A   6/1999
JP     2011-507338 A   3/2011
(Continued)

OTHER PUBLICATIONS

International Search Report from International Application No. PCT/JP2015/058086 dated Jun. 23, 2015.

*Primary Examiner* — Kwang B Yao
*Assistant Examiner* — Ricardo Castaneyra
(74) *Attorney, Agent, or Firm* — Brundidge & Stanger, P.C.

(57) ABSTRACT

A method for adjusting a transmission timing of a terminal station, which is performed at a base station in a Time-Division Duplex communication system, is disclosed. The method includes (a) receiving ranging signals or other reference signals, transmitted from a terminal station; (b) determining whether transmission timing at the terminal station is appropriate or not, by referring to the ranging signals transmitted from the terminal station; and (c) transmitting a value for adjusting the transmission timing at the terminal station. The value of the transmission timing is a value of the integral multiples of the timing offset detection capability of the ranging signal, or a value calculated by referring to the received reference signals, which have assigned with a different interval from an interval of the ranging signals.

4 Claims, 20 Drawing Sheets

(51) Int. Cl.
    *H04B 17/336* (2015.01)
    *H04L 5/00* (2006.01)
    *H04L 5/14* (2006.01)
    *H04L 27/26* (2006.01)
    *H04W 88/02* (2009.01)
    *H04W 88/08* (2009.01)
    *H04W 52/24* (2009.01)

(52) U.S. Cl.
    CPC .......... *H04L 5/0048* (2013.01); *H04L 5/0051* (2013.01); *H04L 5/0053* (2013.01); *H04L 5/14* (2013.01); *H04L 27/2601* (2013.01); *H04L 27/2613* (2013.01); *H04W 52/241* (2013.01); *H04W 88/02* (2013.01); *H04W 88/08* (2013.01)

(58) Field of Classification Search
    CPC . H04L 27/2601; H04L 5/1438; H04L 1/0006; H04L 1/0076
    See application file for complete search history.

(56) References Cited

U.S. PATENT DOCUMENTS

| | | | |
|---|---|---|---|
| 2007/0274265 A1* | 11/2007 | Yoon | H04W 72/0453 370/335 |
| 2007/0293244 A1* | 12/2007 | Lee | H04W 60/04 455/456.5 |
| 2009/0147872 A1 | 6/2009 | Chong et al. | |
| 2011/0211571 A1* | 9/2011 | Ryu | H04J 3/0682 370/350 |
| 2013/0069828 A1* | 3/2013 | Cheng | H04W 74/0891 342/458 |
| 2015/0373660 A1* | 12/2015 | Gunnarsson | H04W 56/0045 370/350 |

FOREIGN PATENT DOCUMENTS

| | | |
|---|---|---|
| JP | 2011-517144 A | 5/2011 |
| JP | 5544222 B2 | 5/2014 |

* cited by examiner

METHOD FOR ADJUSTING TRANSMISSION TIMING IN MULTIPLE ACCESS SYSTEM

CROSS-REFERENCE TO RELATED APPLICATION

The present application is a continuation-in-part application under 35 U.S.C § 111(a) of International Application No. PCT/JP2015/058086, filed Mar. 18, 2015, which claims priority to Japanese Patent Application No. 2014-084210, filed Apr. 16, 2014. The contents of these applications are incorporated herein by reference in their entirety.

TECHNICAL FIELD

The present invention relates to wireless communication system. In particular, the present invention relates to a method for adjusting transmission timing at a terminal station in a multiple access system.

BACKGROUND ART

In wireless communications, a delay due to the propagation distance in proportion to the length of the optical path may occur. Generally, in a cellular system including a base station and a terminal station, the base station may become a master to control the synchronization of a plurality of terminal stations. The terminal station may transmit a signal so that the signal reaches to the base station at a timing which is determined by the base station. If an error with respect to a synchronization of timing occurs, interference with other stations may occur.

Specifically, a multiple access system like Time Division Multiple Access (TDMA) system is configured by some units, each length of the unit corresponds to a transmission period, the unit being called such as "a frame" or "a slot". If a timing error is large, a station may transmit a signal beyond its allowed transmission period, across a plurality of frames or slots. An overlap with the transmission period of other stations may cause interference at the other stations. In addition, in the multiple access system using Cyclic Prefix (CP), like Orthogonal Frequency Division Multiple Access (OFDMA), if the timing error exceeds Cyclic Prefix (CP), orthogonality characteristics may be lost. Thus, the station may not be able to separate the signals caused by some stations, into a signal corresponding to each station.

As a method for establishing synchronization between a base station and a terminal station, for example, in the system of Worldwide Interoperability for Microwave Access (WiMAX), Long Term Evolution (LTE) or IEEE802.22, a terminal station transmits a signal, called a ranging code or a random access preamble, to a base station for establishing synchronization. Thereafter, the base station detects a timing error based at least in part on the signal, then the base station notifies the terminal station of the timing adjusting value or the offset value (differential value) from the predetermined timing, them the terminal station performs a timing adjustment to establish synchronization. In this scheme, the terminology "ranging" means an adjusting process for a transmission power, a frequency or transmission timing at the terminal station, based at least in part on a location of the terminal station, in an initial stage of establishing communication between the base station and the terminal station.

In the system using Orthogonal Frequency Division Multiplexing Modulation (OFDM Modulation), a terminal station transmits a signal in the time domain as a symbol for a ranging. Here, the signal in the time domain is generated by OFDM Modulation (Inverse Fast Fourier Transform (IFFT)), under subcarrier modulation of a random code. As to a method for detecting timing offset in the base station, there is a method utilizing a correlation of an output from an OFDM demodulator (Fast Fourier Transform (FFT)) and a code. When a timing offset between the actual timing of a received signal and the timing which is assumed by the base station is occurred, a phase difference is generated between subcarriers after the FFT output. The phase difference increases in proportion to the frequency difference. Using this characteristic, there is a method for detecting a timing offset based at least in part on the difference between the subcarrier interval and the phase rotation amount.

For example, in the case of OFDM system where a size of FFT is prescribed for 2048 points, such as IEEE802.22, the subcarrier having the longest period consists of 2,048 samples as one period. Therefore, when one (1) sample of timing offset occurs, phase rotation of $2\pi/2048$ radians occurs. Similarly, in the subcarrier which is adjacent to the subcarrier having the longest period, the phase rotation of $2 \times 2\pi/2048$ radians occurs. That is, when comparing the amount of phase rotation between subcarrier adjacent each other, there is the phase difference of $2\pi/2048$ radians. Since a ranging subcarrier (subcarrier for ranging signal) is allocated at every ten (10) subcarriers in IEEE802.22, there is the phase difference of $10 \times 2\pi/2048$ radians in the relationship between subcarriers away 10 subcarriers. Therefore, when the phase difference between the ranging subcarriers for the output after FFT is $\varphi$ radians, a timing offset can be calculated by the following formula (1).

$$\text{Offset} = \frac{2048\varphi}{2\pi \times 10} \qquad \text{formula (1)}$$

PRIOR ART DOCUMENTS PATENT LITERATURE

Patent Document 1: Japanese Unexamined Patent Application Publication (Translation of PCT Application) No. 2011-517144

Patent Document 2: Japanese Patent No. 5544222

Non-Patent Literature

Non-Patent Document 1: Institute of Electrical and Electronics Engineers (IEEE) Computer Society, eds., "IEEE Std 802.22-2011 Part 22: Cognitive Wireless RAN Medium Access Control (MAC) and Physical Layer (PHY) Specifications: Policies and Procedures for Operation in the TV Bands" (The United States), IEEE Standards Association, Jul. 27, 2011, p. 53, 327, 353

SUMMARY

As stated above, in the OFDM system, it is possible to reduce a load for a timing adjustment because a timing offset can be detected without assigning random codes to all subcarriers. However, when the interval between subcarriers for ranging signals is large, there is a problem that a base station cannot correctly detect a large timing offset, including even less than one (1) symbol time. For example, in the case of IEEE 802.22, the phase difference caused by the offset of the ten (10) samples is represented by the following formula (2), the phase difference generated by the offset of the 214.8 samples is represented by the following formula (3).

$$\varphi(10) = \frac{2\pi \times 10}{2048} \times 10 = 2\pi \times \frac{100}{2048} \qquad \text{formula (2)}$$

$$\varphi(214.8) = \frac{2\pi \times 214.8}{2048} \times 10 = 2\pi \times \left(1 + \frac{100}{2048}\right) \qquad \text{formula (3)}$$

In this way, as a base station in the OFDM system cannot distinguish the phase difference of the integral multiple of $2\pi$, when the base station tries to calculate the timing offset by the phase difference, an ambiguity (equivocalness) is sensed at every 204.8 sampling period. Consequently, the receiver like the base station cannot identify the offset uniquely based on the random codes.

The specifications standardized in the IEEE 802.22 are considering the channel intervals as 6 MHz, 7 MHz, or 8 MHz, corresponding to the base channel of television broadcast band in some countries. In the case that the base channels are assigned with the interval of 6 MHz, the sampling period corresponds to 146 ns. Then, a timing error of 10 samples corresponds to 1.46 µs. It corresponds to the 438 m in terms of the spatial distance by multiplying the speed of light. Similarly, a delay corresponding to 214.8 samples is equivalent to 9.4 km. Since these distances correspond to the propagation distance of coming and going, the base station cannot distinguish the 219 m from 4.7 km. As the standard of IEEE802.22 addresses Wireless Regional Area Networks, it is explicit that the capability of the distance measurement is not sufficient.

The initial ranging stage in IEEE 802.22, the terminal station can only transmit the ranging signals by using the sub-channels which are allocated with the interval of 10 subcarriers each other as described above. The maximum detection ability of the timing offset with the ranging signal is 204.8 samples (equivalent to 4.5 km). When the distance between the base station and the terminal station is longer than 4.5 km, it is a problem that the base station cannot adjust the timing offset properly.

The present invention has been made in view of the conventional circumstances as described above. When it seems that the transmission timing of the terminal station has apparently been adjusted to the successful status due to the ranging process, but practically, the transmission timing of the terminal station has not been adjusted exactly yet, the present invention is intended to adjust the transmission timing of the terminal station properly.

Solution to Problem

According to an aspect of the present invention, a wireless communication system includes a base station and a terminal station. The base station may transmit an adjustment value of the transmission timing for the terminal station to the terminal station, the adjustment value of the transmission timing being calculated based at least in part on a ranging signal transmitted from the terminal station. The terminal station may adjust own transmission timing in accordance with the adjustment value of the transmission timing, being transmitted from the base station.

For example, even when the base station judges the adjustment of the transmission timing based at least in part on the ranging signal becomes a state of success apparently, the base station further judges whether the adjustment of the transmission timing at the terminal station is appropriate. When the adjustment of the transmission timing is determined to be inappropriate, the base station may calculate an adjusting value for the transmission timing at the terminal station, the adjusting value corresponds to an integer multiple of the timing offset detection capability by referring to the ranging signal. Then, the base station may transmit the adjustment value to the terminal station to attempt a further adjustment of the transmission timing.

In addition, when the base station determines that the adjustment of the transmission timing is inappropriate, the base station may calculate an adjustment value corresponding to the shortage of the timing offset detection capability by referring to the ranging signal. The base station may transmit the calculated adjustment value to the terminal station. Thus, the base station may have the terminal station perform a further adjustment of the transmission timing based at least in part on the calculated adjustment value.

In addition, when the base station determines that the adjustment of the transmission timing is inappropriate, the base station may calculate an adjustment value based at least in part on a reference signal except the ranging signal, being transmitted from the terminal station. An interval between the reference signals is different from an interval between the ranging signals. The base station may transmit the calculated adjustment value to the terminal station. Thus, the base station may have the terminal station perform a further adjustment of the transmission timing based at least in part on the calculated adjustment value.

In the base station, there are some methods for determining whether the adjustment of the transmission timing at the terminal station is appropriate. As an example, in a case that a value of Carrier-to-Interference and Noise Ratio (CINR), which is estimated from the pilot symbols, the pilot symbols being embedded for the channel estimation, is lower than a value of CINR, which is expected in accordance with the power of a receiving signal from the terminal station, and the difference between both values of CINR is equal to or higher than the specific threshold value, an adjustment of the transmitting timing at the terminal station can be judged as being inappropriate.

As another example for determining whether the adjustment of the transmission timing at the terminal station is appropriate, the base station may calculate a distance between the base station and the terminal station based at least in part on the location information, the location information being captured during the session for establishing the connection with the terminal station. In a case that the distance between the base station and the terminal station exceeds an adjustable limit distance by referring to the ranging signal, the adjustment of the transmitting timing at the terminal station can be judged as being inappropriate.

Advantageous Effects of Embodiment(s)

According to an aspect of the present invention, even when the base station judges the adjustment of the transmission timing in accordance with the ranging signal becomes a state of success apparently, but the transmission timing at the terminal station has not actually adjusted properly yet, the base station can further adjust the transmission timing at the terminal station properly.

DESCRIPTION OF EMBODIMENTS

Figure 1:
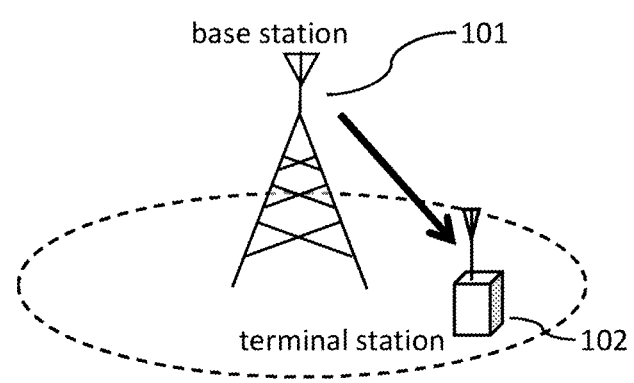
FIG. 1 is a diagram illustrating an example of an overall configuration of a wireless communication system according to an embodiment of the present invention.

One embodiment of the present invention will be described with reference to the drawings. In each drawing to be referred to in the following description, the same parts in other drawings are indicated by the same reference numerals.

<Outline of Radio Communication System>

FIG. 1 shows an example of an overall configuration of a wireless communication system according to this embodiment.

A wireless communication system of this embodiment may include base station 2 and terminal station 3 corresponding to the base station 2. Terminal station 3 may be singular or plural. The wireless communication system may improve a base system regarding IEEE 802.22-2011, described in Non-Patent Document 1. That is, after the establishment of synchronization between base station 2 and terminal station 3, base station 2 may repeat the following processes until a state that base station 2 can judge an initial connection between base station 2 and terminal station 3 is successfully completed, the processes in base station 2 may include: calculating the adjustment values of the transmission power, the frequency, or the transmission timing at terminal station 3, in response to the ranging signals, which have been transmitted from terminal station 3, and transmitting a ranging command including the adjustment values of the transmission power, the frequency, or the transmission timing at terminal station 3 to terminal station 3 as a ranging response. In the wireless communication system of this embodiment, base station 2 may include a configuration for calculating a timing offset without using the ranging signal. Terminal station 3 may include a configuration for adjusting its transmission timing under the condition that terminal station 3 fails to connect with base station 2 at initial stage.

<Example of a Configuration of the Base Station>

Figure 2:
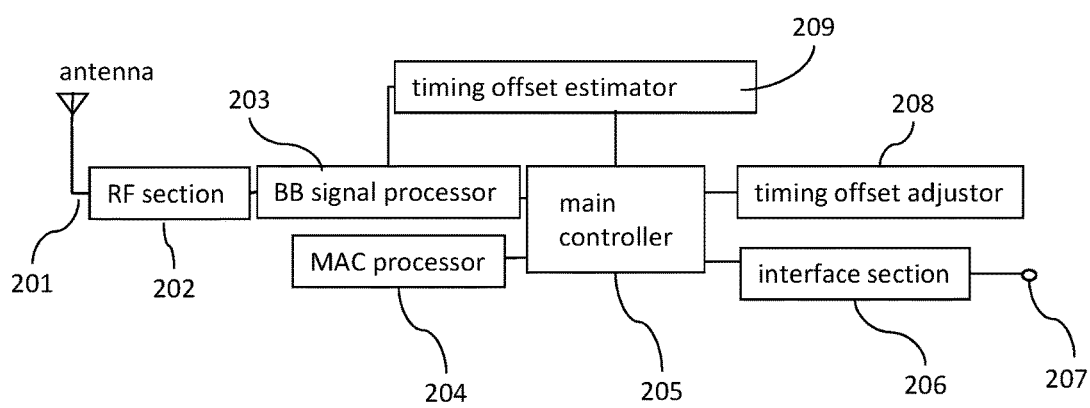
FIG. 2 is a diagram illustrating a configuration example of a base station.

FIG. 2 shows an exemplary configuration of base station 2.

Base station 2 may include antenna 201, RF section 202, base band (BB) signal processor 203, MAC processor 204, main controller 205, interface section 206, external network connector 207, timing offset adjustor 208, and timing offset estimator 209.

Antenna 201 may be responsible for transmitting and receiving radio waves.

RF section 202 may convert frequencies for transmitting and receiving signals from a base band frequency to a radio frequency, or from a radio frequency to a base band frequency, and RF section 202 may amplify such signals. BB signal processor 203 may perform error correction coding, decoding, and demodulation processing or the like. In addition, BB signal processor 203 may calculate the receiving power or CINR, then BB signal processor 203 may provide the calculated reception power or CINR to timing offset adjustor 208 as the information of the communication quality.

MAC processor 204 may control the frequency channel for using its own station, or may control the data transmission timing. MAC processor 204 may add the own station identifier to a packet. MAC processor 204 may process the recognition of the wireless device as a data transmission source. In addition, MAC processor 204 may provide the location information to timing offset adjustor 208 in accordance with the location information of base station 2 (longitude and latitude of base station 2) and memorized location information of terminal station 3 which was notified from terminal station 3.

Main controller 205 may control each part of base station 2. And main controller 205 may have a role of interface between each part. Interface section 206 may have a role as an interface with the external network. External network connector 207 may include a terminal for connecting to an external network.

Timing offset estimator 209 may provide an estimated value of timing offset to timing offset adjustor 208. The estimated value of timing offset may be estimated in accordance with the pilot signal being provided from BB signal processor 203, the pilot signal being performed Fast Fourier Transform (FFT). The estimated value of timing offset may be ambiguous, therefore, the information of the likelihood of the individual estimated value may be also provided with the estimated value of timing offset.

Timing offset adjustor 208 may determine the adjustment quantity of timing offset, based at least in part on the communication quality information, including the information of reception power or CINR, provided from BB signal processor 203. Timing offset adjustor 208 may determine the adjustment quantity of timing offset, based at least in part on the location information of terminal station 3, which has been provided from the MAC processor 204. Timing offset adjustor 208 may determine the adjustment quantity of timing offset, based at least in part on the estimated value of timing offset, which has been provided from timing offset estimator 209.

Figure 7:
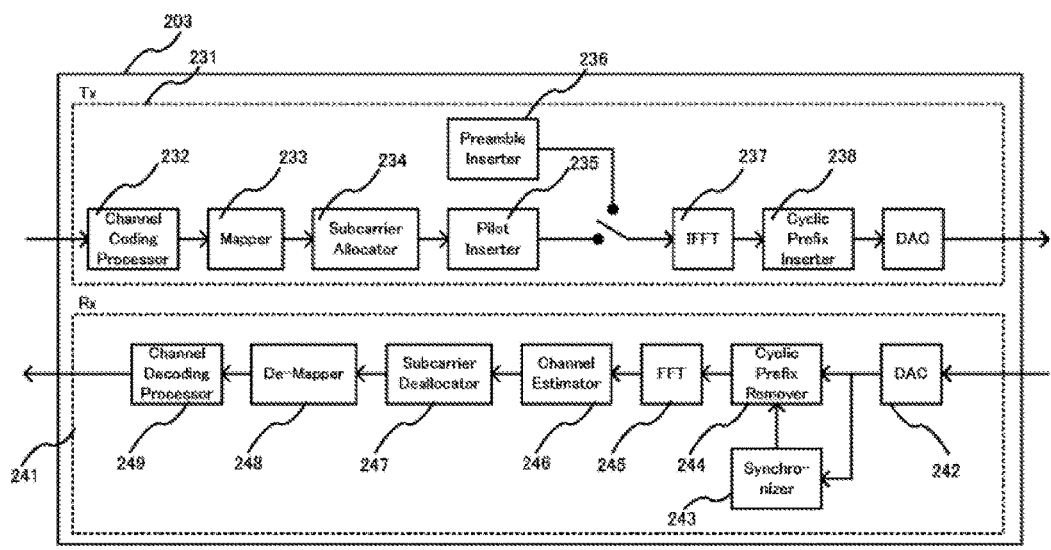
FIG. 7 is a block diagram showing the internal configuration of the BB processing unit 203 of the base station.

FIG. 7 shows an internal circuitry of BB signal processor 203 at base station 2. BB signal processor 203 may include transmitter (Tx) 231 and receiver (Rx) 241.

Transmitter (Tx) 231 may include channel codec 232, mapper 233, sub-carrier allocator 234, pilot symbol inserter 235, preamble inserter 236, IFFT 237, Cyclic Prefix (CP) inserter 238, and D/A converter (DAC) 239. Channel codec 232 may perform channel encoding of the error correction. Mapper 233 may map the transmission data into the constellation symbols of I/Q (In-phase/Quadrature) space. Sub-carrier allocator 234 may allocate the sub-channels, consisted of 60 channels for data communication, to the physical subcarriers, consisted of 1,440 carriers for data communication. Pilot symbol inserter 235 may insert a pilot symbol in a predetermined sub-carrier. Preamble inserter 236 may insert a preamble in a predetermined symbol. IFFT 237 may perform Inverse Fast Fourier Transform (IFFT). CP inserter 238 may insert the CP (Cyclic Prefix) for avoiding the influence of a delayed wave.

Receiver (Rx) 241 may include ADC 242, which may output digital orthogonal signals converted from the signals which received from one or a plurality of terminal stations, synchronizer 243, which may determine a FFT window in accordance with a preamble or CP included in the received signal, CP eliminator 244 to cut out a received signal with the specific FFT window, FFT 245 for the Fast Fourier Transform (FFT), channel estimator 246, which may estimate a propagation path corresponding to every sub-channel that an origin of transmission is the same, sub-carrier de-allocator 247 for bundling the sub-carriers in the sub-channel, de-mapper 248, which performs frequency domain equalization based at least in part on the propagation path estimation result and judges symbols, and channel decoder 249 for decoding the sign of the determination results.

Receiver (Rx) 241 may receive a signal, multiplexed on a subcarrier (frequency space) and a symbol (time), the signal being transmitted by each of terminal station 3 more than two. Synchronizer 243 may attempt to allocate a FFT window so as to be allocated for an optimum time position corresponding to all OFDM symbols composed of all utilized sub-channels. Alternatively, regardless of the observation of the received signal, a FFT window may be allocated to the time position, merely offset a predetermined time from the time position where CP inserter 238 may insert the CP.

BB signal processor 203 can accommodate to burst signals, including the burst signal in a ranging signal or CBP burst signal, in the uplink or downlink sub-frames. The burst signals can be treated by selecting an appropriate modulation scheme and coding scheme. Timing offset estimator 209 or BB signal processor 203, illustrated explicitly in FIG. 2 or FIG. 3 can correspond to the processing function for response to the ranging signal.

Figure 8:
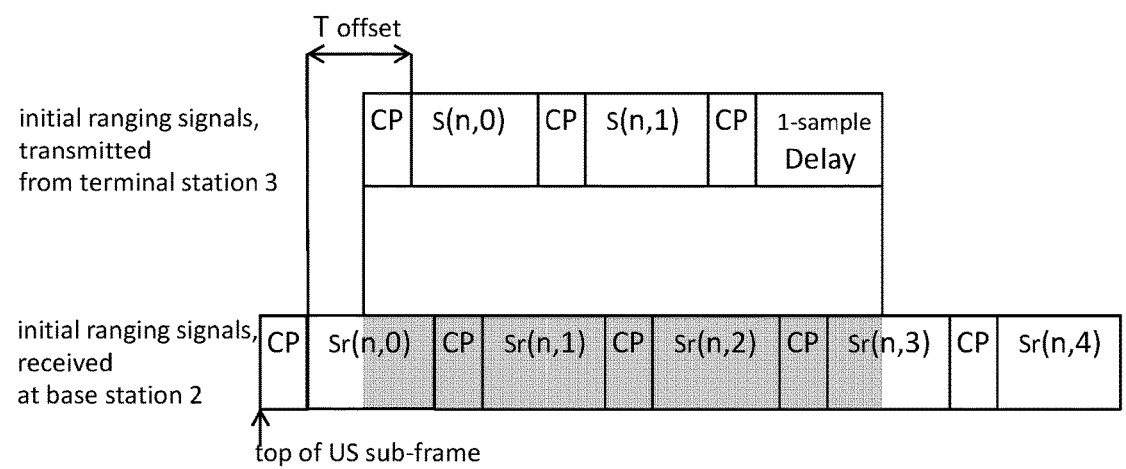
FIG. 8 is a schematic diagram of a receiving timing of the initial ranging signal.

FIG. 8 shows a reception timing of the initial ranging signal schematically. Shown on the upper side of FIG. 8, the time representation of the signal transmitted from terminal station 3 may be determined as follows according to Non-Patent Document 1.

$$s(n, l) = \sum_{k=0}^{N_{FFT}-1} \left[ b_k \cdot e^{j2\pi \frac{k \cdot l \cdot N_{CP}}{N_{FFT}}} \right] \cdot e^{j2\pi \frac{k \cdot n}{N_{FFT}}} = \quad \text{formula (4)}$$

$$\sum_{k=0}^{N_{FFT}-1} \left[ b_k \cdot e^{j2\pi \frac{k \cdot (n+l \cdot N_{CP})}{N_{FFT}}} \right]$$

$$b_k = \begin{cases} 2 \cdot \left( \frac{1}{2} - C_i \right), & i = i+1, \; k \in R \\ 0, & k \in R \end{cases}$$

where, s (n, l) represents in the l-th OFDM symbol in the initial ranging, n represents a sample index, l is an index that is specified among [0, 1, 2], k represents a subcarrier index within the sub-channel, Ci represents a ranging code, i is an index that is specified among $[0 \sim N_{code}-1]$, R represents the set of indices of the subcarriers included in the ranging sub-channels, $N_{FFT}$ represents the FFT size (2048), $N_{CP}$ represents the size of the CP. That is, the initial ranging signals do not change their modulations across three (3) OFDM symbols. In other word, the initial ranging signals may correspond to a tone signal, which does not become discontinuous at even the symbol boundary.

As shown on lower side of FIG. 8, the signal $s_r$ (n, θ), received at the timing of base station 2 is illustrated. Base station 2 is awaiting an initial ranging signal during five (5) OFDM symbols from the beginning of the US sub-frame. Top of US sub-frame may be arranged to the time position after progress of the time of Transmit/Receive Transition Gap (TTG) from the time position of the end of the DS sub-frame, Transmit/Receive Transition Gap (TTG) being notified in Downstream Channel Descriptor (DCD). The signal s (n, l) may be received across four (4) OFDM symbols in base station 2. Two (2) OFDM symbols close to a center among the four (4) OFDM symbols may be completely received, but signal strength of other two (2) OFDM symbols located at both ends may be weakened because these symbols can be received partially. It should be noted that we do not take into account the multi-path reception in FIG. 8. The multi-path reception will be considered later.

Figure 9:
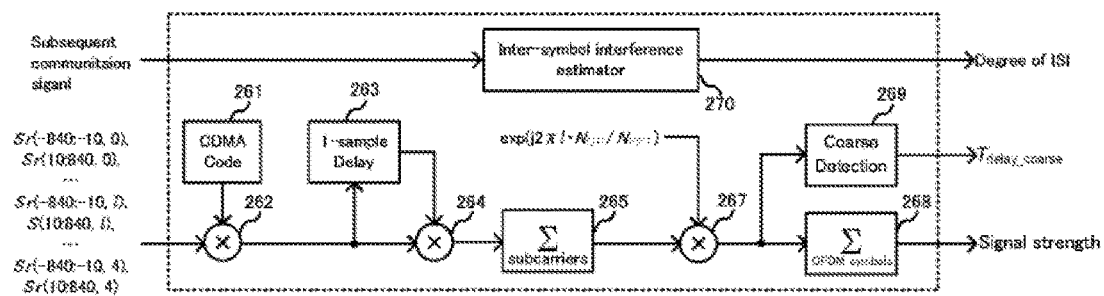
FIG. 9 is a block diagram showing an example of BB processing part of the timing offset estimation unit 209.

A simple example of a Base Band (BB) processing circuitry in timing offset estimator 209 is illustrated in FIG. 9. During five (5) OFDM symbols from the beginning of the uplink sub-frame, Received signals (Sr) using sub-channels {−840, −830, . . . , −20, −10,10,20, . . . , 830, 840}, which are reserved for ranging or bandwidth requests, may be serially input into timing offset estimator 209. Furthermore, as a characteristic feature of the present embodiment, the signal from the terminal station after an initial ranging process (for example, a registration request signal to the base station) may be input into timing offset estimator 209.

CDMA code generator 261 may generate Pseudo Random Binary Sequence (PRBS) in accordance with the generator polynomial. A seed value for the generator polynomial may be set in accordance with a start number S, which was notified by Start of CDMA codes group information element (element ID: 154) in Upstream Channel Descriptor (UCD), from base station 2 to terminal station 3.

Sign inverter 262 may invert the signs of received signals ($S_r$), which is sequentially input, by referring to PRBS, being sequentially input similarly. In other words, the received signals ($S_r$) may be spread reversely. Specifically, the sign of received signal ($S_r$) may be inverted when PRBS is 0, and the sign of received signal ($S_r$) is outputted as it is when PRBS is 1.

One sample delay device 263 may retain current one sample, which has outputted from sign inverter 262, then one sample delay device 263 may output the sample corresponding to the sample which has retained during one sample time from the present. Complex conjugate multiplier 264 may output a result of complex conjugate multiplication of the output of sign inverter 262 and one sample delay device 263. This is an operation for determining a phase difference between a subcarrier adjacent each other in the ranging signals. Incidentally, complex conjugate multiplier 264 does not perform the complex conjugate multiplication across OFDM symbols.

Accumulator 265 may output an accumulated phase differences, by adding the outputs of the complex conjugate multiplier 264 cumulatively, during one (1) OFDM symbol. That is, accumulator 265 may output five (5) cumulative phase differences at every one (1) OFDM simple. Each cumulative phase difference corresponds to a result of addition of 167 phase differences between subcarriers. Accumulator 267 may multiply the corresponding phase rotation quantity exp $(j2\pi l \cdot N_{CP}/N_{FFT})$ by the l-th OFDM symbol, where l=0, 1, 2, 3, or 4. The phase rotation may be generated according to $N_{CP}/N_{FFT}$, due to the retention of continuity between symbols, as shown in FIG. 8. The phase rotation of the first symbol, being the reference symbol may be set to zero (0).

Accumulator 268 may output the cumulative phase difference as signal strength of the initial ranging. The cumulative phase difference corresponds to a result of addition of compensated rotations over five (5) OFDM symbols.

In a state that the five cumulative phase differences, being outputted from accumulator 267, are translated to absolute values, accumulator 269 may calculate a coarse timing $T_{offset\_coarse}$ in accordance with the following formula.

$$T_{offset\_coarse}=(l+(-P_1+P_4)/(P_2+P_3))\times N_{FFT}$$

where, $P_1$ to $P_4$ are continuous four (4) OFDM symbols (ordered sequentially at the time), just eliminated a minimum absolute value from among the five (5) accumulated phase differences.

The above formula means that $T_{offset\_coarse}$ may be represented by the ratio of domain expressed by hatching at $S_r(n,0)$ or $S_r(n,3)$ in FIG. 8. However during the period that the beginning or end of the ranging signal is in accord with the timing of CP at base station, the beginning or end of the ranging signal may be not able to be detected. $T_{offset\_coarse}$ may include timing error at the propagation path except the state to be able to consider the single path.

On the other hand, inter-symbol interference estimator 270 may be inputted sub-channel signals, assigned for the uplink communication of terminal station 3 after the initial ranging process, by sub-carrier de-allocator 247. Inter-symbol interference estimator 270 may estimate the inter-symbol interferences, then, Inter-symbol interference estimator 270 may output the degree of inter-symbol interference as CINR. Inter-symbol interference can be estimated easily by the difference (equalization error) between the equalized signal by referring to the estimation result of the channel estimator 246 and the result of hard decision of the equalized signal at de-mapper 248. Then, the degree of inter-symbol interference can be obtained by accumulating the electricity of equalization error. In addition, the signals which are using for estimating the inter-symbol interference are not only the signals from terminal station 3 after the initial ranging process, but also other upstream signals.

Figure 10:
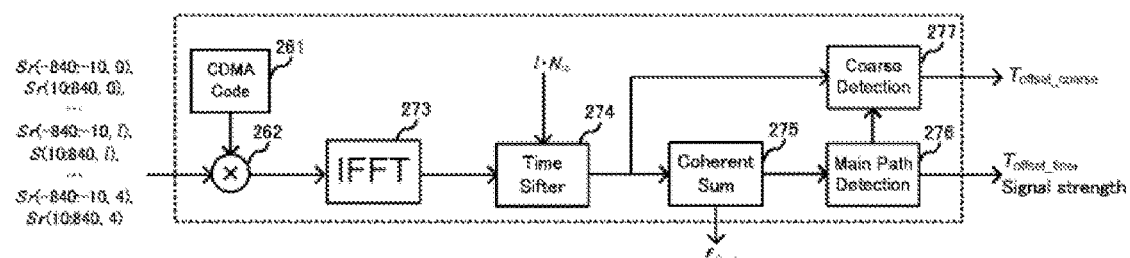
FIG. 10 is a block diagram showing another example of BB processing part of the timing offset estimation unit 209.

FIG. 10 shows a more practical example for Base Band (BB) processing circuitry of timing offset estimator 209. CDMA code generator 261 or code inverter 262 in FIG. 10 may correspond to the timing offset estimator, respectively, disclosed in FIG. 9. Inter-symbol interference estimator 270 may be also included, but not illustrated in FIG. 10 because the configuration may be same as shown in FIG. 9.

IFFT 273 may output the delay profile, obtained by converting the output of sign inverter 262 from the frequency domain to the time domain at every one (1) symbol. An appropriate filter (or window function) can be installed before IFFT 273.

Time shifter 274 may generate a delay ($l \cdot N_{CP}$), corresponding to the delay profile of the l-th OFDM symbol, where l=0, 1, 2, 3, or 4. Since the outputs of the IFFT 273 may be time-series signals, giving the delays may be performed by shifting or rotating the time-series signals.

Coherent sum device 275 may sum delay profiles under the phase matching, as to five (5) OFDM symbols, which are output from time shifter 274. Depending on the shift of the carrier frequency, delay profiles may have uniform phase rotations. In view of S/N, in-phase summation of delay profiles may be more advantageous than the power summation. Based at least in part on the rate of change of phase rotation required for the in-phase summation, the frequency offset may be gotten derivatively.

Main path detector 276 may detect the position of the maximum peak, corresponding to the main path, by referring to the delay profile combined coherently. Then, Main path detector 276 may output the position of the maximum peak as $T_{offset\_fine}$. As mentioned above, $T_{offset\_fine}$ may be dealt within the range of 0 to $N_{FFT}/10$ due to its ambiguity ($N_{FFT}/10$, corresponding to the maximum ranging distance). The size of the maximum peak may indicate the signal strength of the initial ranging.

Like accumulator 269 in FIG. 9, accumulator 277 may calculate the coarse timing $T_{offset\_coarse}$, by referring to the absolute value of the maximum peak of the delay profile, corresponding to each of the OFDM symbol before the pre-coherent combining. To reduce or omit the overhead for searching the maximum peak, the position detected by main path detector 276 is available.

In other words, accumulator 277 may output the coarse timing $T_{offset\_coarse}$, under making the five cumulative phase differences absolute values, the five cumulative phase differences being outputted from accumulator 267.

The phase rotation may be generated according to $N_{CP}/N_{FFT}$, due to the retention of continuity between symbols shown in FIG. 8. The phase rotation of the first symbol to be a reference is set to 0. The output of sign inverter 262 may be converted from the frequency domain to the time domain at every one (1) symbol. An appropriate filter (or window function) can be installed before IFFT 273.

According to the examples of Base Band (BB) processing circuitry of timing offset estimator 209, illustrated in FIGS. 9 and 10, the ambiguous timing offset can narrow down the most likely candidate by using the specific timing offset given by the following formula $T_{offset}=T_{offset\_coarse}+T_{offset\_fine}$. However, it is still difficult and not perfect to reliably distinguish between the delay of 10 samples and 214.8 samples for the insensitive area where we mentioned above.

<Example of a Configuration of the Terminal Station>

Figure 3:
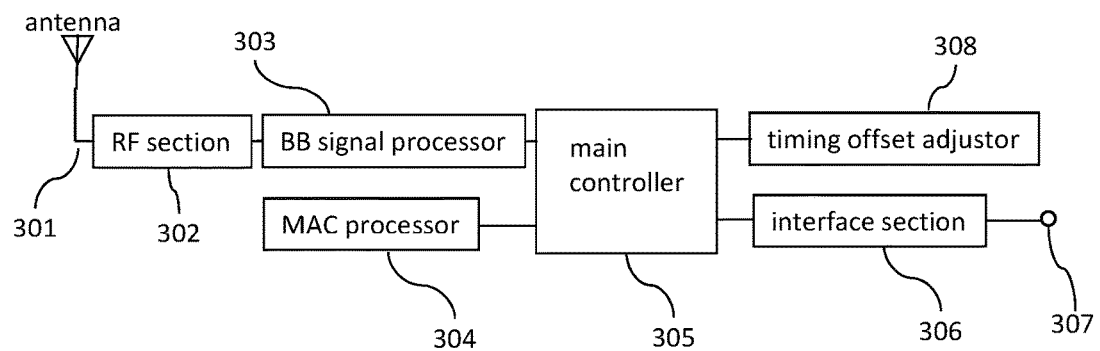
FIG. 3 is a diagram illustrating a configuration example of a terminal station.

An exemplary configuration of terminal station 3 is illustrated in FIG. 3.

Terminal station 3 may include antenna 301, RF section 302, BB signal processor 303, MAC processor 304, main controller 305, interface section 306, external network connector 307, and timing offset adjustor 308.

Antenna 301 may be responsible for transmitting and receiving radio waves.

RF section 302 may convert frequencies for transmitting and receiving signals, from the base band frequency to the radio frequency, or from the radio frequency to the base band frequency, and may amplify such signals. In terminal station 3, the carrier frequency for transmission therewith may be desirable to be assigned to the frequency matching with a reception frequency from the base station, under the condition that the error between the carrier frequency for transmission and reception is less than half of the sub-carrier interval. This scheme may be achieved by using the frequency, which is detected by referring to the received carrier signal from base station 2, as the carrier frequency for transmission at terminal station 3.

BB signal processor 303 may perform error correction coding, decoding, and demodulation processing or the like.

MAC processor 304 may control its frequency channel or data transmission timing, adds the own station identifier to the packet, and processes the recognition of data transmission source of the wireless device.

The main controller 305 may control each part with the role of interface between each part. Interface section 306 may have a role as an interface with the external network.

External network connector 307 may include a terminal for connecting to an external network.

Timing offset adjustor 308 may perform the timing adjustment by giving an offset, for example, the offset may be an integral multiple of the timing offset detection capability of the ranging signal, when the ranging command from base station 2 includes the information as "success", in other words, the adjustments of the transmission power, the frequency or the transmission timing has apparently been finished successfully, but the subsequent initial connection process has not been successful.

<Initial Ranging of the Wireless Communication System>

Figure 4:
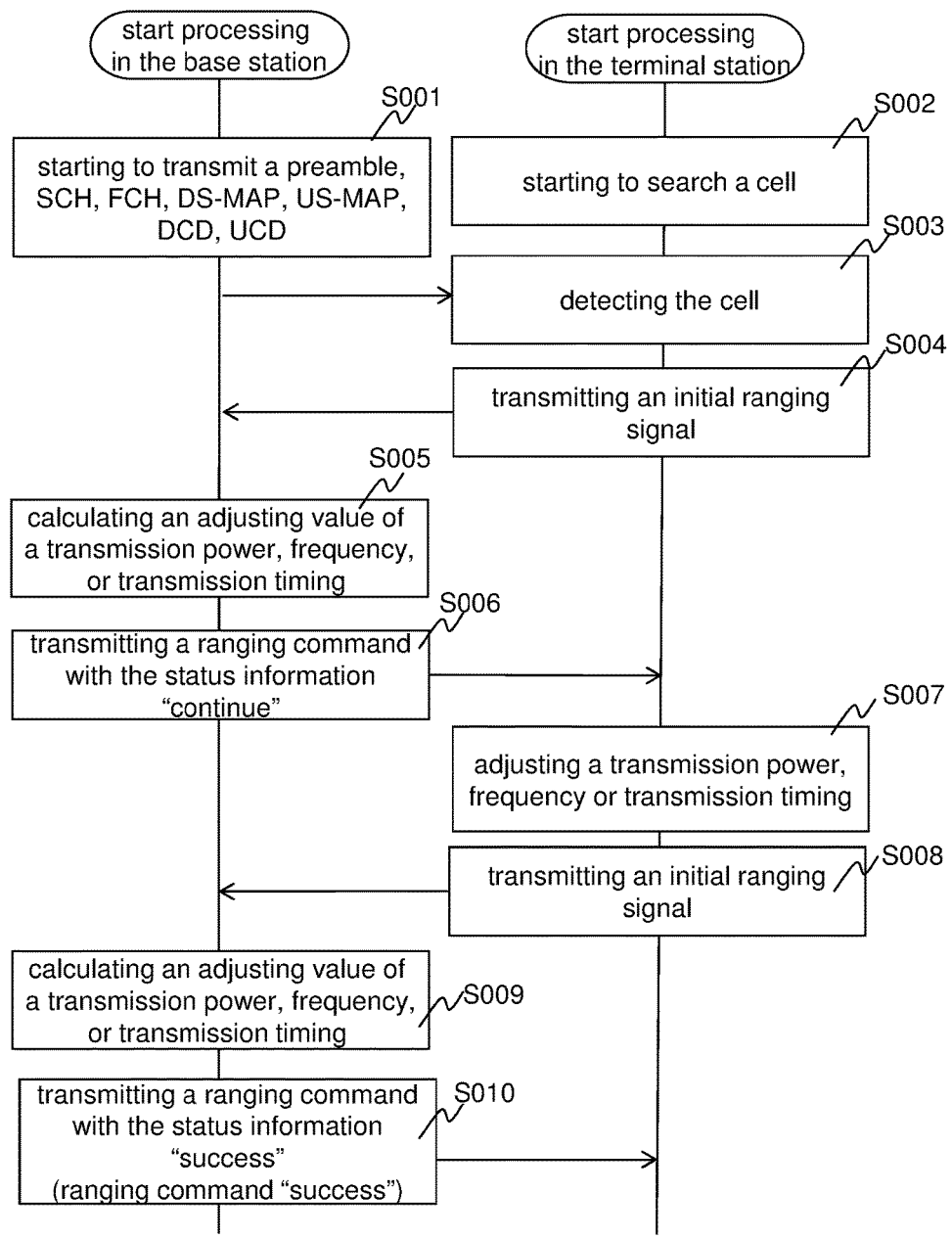
FIG. 4 is a flow diagram of an initial ranging process in a wireless communication system.

Referring to FIG. 4, an initial ranging of the wireless communication system will be described.

An operation of the initial ranging in the present embodiment may improve a conventional operation of the initial ranging. In the present embodiment, a transmission power, a frequency or a transmission timing of terminal station 3 may be adjusted by the ranging between base station 2 and terminal station 3. The distance between base station 2 and terminal station 3 may be intended to be farther than the maximum measuring distance, which is limited by the timing offset detection capability of the initial ranging signal.

Incidentally, each process of initial ranging may be performed at timing offset adjustor 208 or timing offset estimator 209 in base station 2, or may be performed at timing offset adjustor 308 or the like in terminal station 3.

After startup, base station 2 may transmit a broadcast message, including SCH, FCH, DS-MAP, US-MAP, DCD, or UCD, for notifying the state of operation of the cell to terminal station 3. And base station 2 may also transmit a preamble for synchronizing the start timings of frames at terminal station 3 (step S001). Each message may be transmitted under the predetermined cycle and timing.

After startup, terminal station 3 may search base station 2 (a cell search process, step S002). In the cell search process at terminal station 3, while sweeping the receiving frequencies in an arbitrary order, terminal station 3 may try to detect a super-frame preamble, transmitted from base station 2, at the beginning of each super-frame. As a result, terminal station 3 can recognize the frequency at which base station 2 is using, thus, terminal station 3 can establish synchronization with base station 2. The super-frame in this embodiment is a unit, being constituted of six-teen (16) frame, each frame is constructed in ten (10) milliseconds. Base station 2 may be broadcasting the basic information of base station 2 every super-frame.

As a result of the cell search process in terminal station 3, when the reception power of the preamble is equal to or larger than the threshold value, terminal station 3 may determine that detection of the cell has succeeded. Then terminal station 3 may receive the operational information of the cell (situation of operation) in accordance with the broadcast messages including SCH, FCH, DS-MAP, US-MAP, DCD, or UCD (step S003).

Thereafter, in order to establish the initial connection to base station 2, terminal station 3 may start the initial ranging by adjusting a transmission power, a frequency or a transmission timing. As a first process, terminal station 3 may transmit an initial ranging signal to base station 2 (Step S004). This may be a first transmission at terminal station 3.

When base station 2 receives an initial ranging signal from terminal station 3, by referring to the initial ranging signal, base station 3 may calculate an adjustment value of a transmission power, frequency, or a transmission timing of terminal station 3 (step S005).

Thereafter, base station 2 may transmit a ranging command including the adjustments value of the transmission power, the frequency, or the transmission timing, which may be calculated in the step S005 (step S006). In this step, by transmitting the ranging command, the ranging command being added the status information of continuation ("continue"), base station 2 have terminal station 3 transmit a ranging signal again, under using the adjusted transmission power, frequency or transmission timing.

When terminal station 3 receives a ranging command from base station 2, by referring to the ranging command, terminal station 3 may adjust a transmission power, frequency, or transmission timing (step S007).

Thereafter, terminal station 3 may transmit an initial ranging signal to base station 2 again (step S008).

When base station 2 receives the initial ranging signal transmitted from terminal station 3 again, base station 2 may calculate an adjustment value of a transmission power, frequency, or transmission timing for terminal station 3 by referring to the initial ranging signal transmitted from terminal station 3 (step S009).

Thereafter, base station 2 may transmit the calculated adjustment value of the transmission power, the frequency, or the transmission timing to terminal station 3 by using a ranging command (step S010). At this time, when base station 2 determines that there is no need to adjust the value of the transmission power, the frequency, or the transmission timing, respectively, or when base station 2 determines that the calculated adjustment amount of the transmission power, the frequency, or the transmission timing is within the allowable range, respectively, based at least in part on the calculated results in the step S009, base station 2 may notify terminal station 3 that the operation of terminal station 3 can move to the next initial connection process, by transmitting a ranging command, including the status information of success ("success").

Incidentally, under the situation that the adjustment is not sufficient, base station 2 may continue to transmit a ranging command, including the status information of continuation ("continue"), the processes of step S006 to step S009 may be repeated.

Here, the adjustment value of the transmission power, the frequency, or the transmission timing can be a target value itself for the adjustment, respectively. In addition, the adjustment value of the transmission power, the frequency, or the transmission timing can be the offset value from the reference value or the current detected value, respectively. The adjustment value of the transmission power, the frequency, or the transmission timing can also be the difference value from the reference value or the current detected value.

<In the Base Station, an Additional Adjustment of the Timing after the Initial Ranging>

Figure 5A:
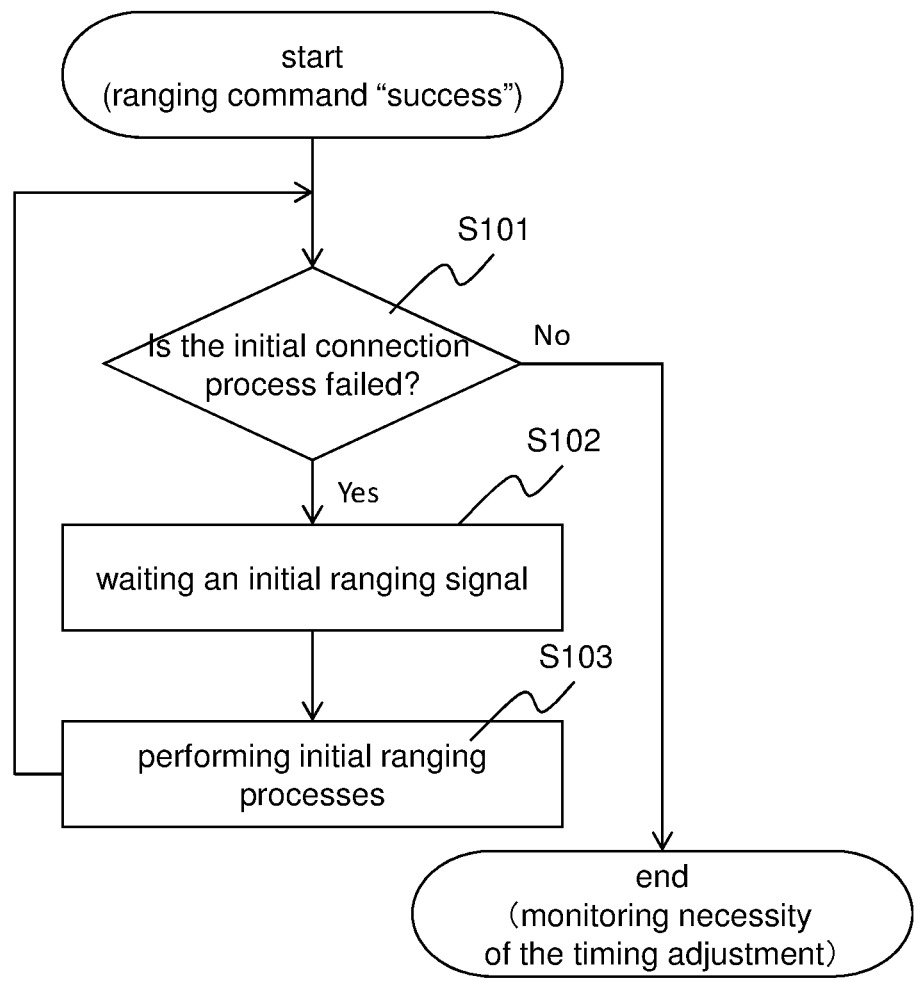
FIGS. 5A and 5B are flow diagrams of an additional adjustment of timing by the base station after the initial ranging process.
Figure 5B:
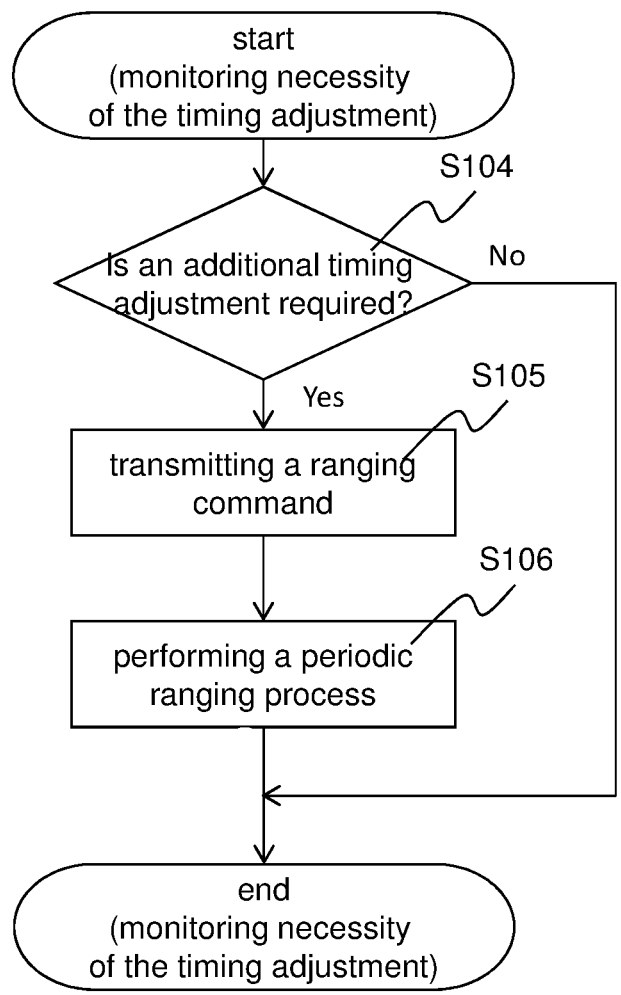

With reference to FIG. 5, we describe an additional adjustment of the transmission timing after the initial ranging in base station 2. Despite the fact that the process of the initial ranging exits with the status of success apparently, when the distance between base station 2 and terminal station 3 exceeds the detection capability of the timing offset of the ranging signal, inter-symbol interference may be occurred. Then, there is a possibility to fail in the communication of the initial connection process. Therefore, in this example, when the initial ranging process is seemingly completed as successful, in other words, even when it becomes a success status, base station 2 may perform an additional adjustment process as follows.

In addition, an additional adjustment of the transmission timing after the initial ranging process in base station 2 may be carried out by such as timing offset adjustor 208 and timing offset estimator 209.

After the initial ranging process is seemingly completed as successful, base station 2 may determine the success or failure of the initial connection process (step S101). As an example, the success or failure of the initial connection process can be determined by a certain degree of inter-symbol interference. For example, in a case that the degree of inter-symbol interference is not less than the specific threshold value, the initial connection process could be considered to be failure, and in a case that the degree of inter-symbol interference is less than the specific threshold value, the initial connection process could be considered to be success.

In the step S101, when the initial connection process is determined to be failed (in a case that a result of the determining step S101 is "Yes"), base station 2 may ignore the signal except an initial ranging signal, the signal being transmitted from terminal station 3 to base station 2, then base station 2 may wait for receiving at least an initial ranging signal transmitted from terminal station 3 again (step S102).

When base station 2 may receive an initial ranging signal transmitted again from terminal station 3, the initial ranging processes, which are corresponding to the steps from step S001 to S010, may be performed between base station 2 and terminal station 3 (step S103). Thereafter, in conventional processes, the operations of conventional initial ranging process may be repeated, but in this embodiment, by performing the steps S201 to S203 in terminal station 3, which are disclosed later, it is possible that base station 2 and terminal station 3 can lead their initial connection process to the success.

In the step S101, when the initial connection process is determined to be succeeded due to the low influence of the inter-symbol interference (in a case that a result of the determining step S101 is "No"), base station 2 may move its operational status to the monitoring status that is monitoring whether terminal station 3 should conduct an additional adjustment for the transmission timing (step S104). For example, as a simple method for determining the necessity of the additional adjustment, base station 2 may calculate the distance d between base station 2 and terminal station 3 based at least in part on the position information, included in the REG-REQ message, which may be notified from terminal station 3 during establishing connection. When the distance d exceeds the adjustable upper limit distance $d_{max}$, which can adjust using a ranging signal, base station 2 can determine that the adjustment of the transmission timing is inappropriate and an additional adjustment of the transmission timing is necessary.

In this way, in a case that base station 2 determines that the additional adjustment for the transmission timing is necessary, base station 2 may calculate the adjustment value so that the transmission timing is shifted forward, corresponding to $[d/d_{max}]-1$ times of the maximum value of the detectable timing offset. The maximum value of the detectable timing offset is specified by the ranging signal transmitted from terminal station 3. Where, [x] represents the floor function that calculates the number, truncated under the decimal point of the real number x (i.e., the integer part of the real number x).

That is, in a case that the distance d exceeds the adjustable distance $d_{max}$, which is adjustable by a ranging signal, base station 2 may calculate the adjustment value ($[d/d_{max}]-1$), corresponding to a shortage of timing offset detection capability of the ranging signal. The adjustment value ($[d/d_{max}]-1$) may also correspond to the value that subtracted the maximum distance $d_{max}$ from the distance d between base station 2 and terminal station 3. In a case that the calculation of the distance between base station 2 and terminal station 3 is accurate, the adjustment value may correspond to the integer multiple of the maximum value of the detectable timing offset by the ranging signal. The adjustment value may also correspond to the integer multiple of the timing offset detection capability of the ranging signal.

Other methods for determining the necessity of additional adjustment for the transmission timing, in a case that the CINR being estimated from the pilot symbols, which are embedded for the channel estimation, is lower than the CINR being expected from the received power of the signal from terminal station 3, and when the difference between these CINRs is equal to or larger than a specific threshold, the adjustment of the transmission timing may be inadequate and an additional adjustment for the transmission timing may be necessary. In this way, the CINR being expected from the received power of the signal from terminal station 3 may be the value that was measured in the case of the production of apparatus as the CINR corresponding to the received power.

The determination of the difference between the CINRs may be implemented in another terminal station, in this case, the determination whether the CINR is deteriorate or not may be performed when another terminal station transmit a signal with terminal station 3.

When an additional adjustment is required in an above-mentioned method, base station 2 may adopt the value of an integral multiple of the maximum detectable timing offset, the maximum detectable timing offset being identified by the ranging signal, as an adjustment value. Base station 2 may also adopt the value of an integral multiple of the timing offset detection capability of the ranging signal, as an adjustment value. As an example, since a timing offset within 204.8 samples is distinguishable in IEEE 802.22, the adjustment value of the timing offset in terminal station 3 can select the value so as to shift the transmission timing forward for 204 or 205 samples. Terminal station 3 may repeat shifting the transmission timing forward by 204 or 205 samples, until the additional adjustment is not required. This repeating process may be based at least in part on a calculation that the value of an integral multiple is generated by adding one (1) to the previous value of the integral multiple, where an initial value of the integral multiple is one (1).

After obtaining the adjustment value of the transmission timing of terminal station 3 as described above, base station 2 may transmit a ranging command, including the adjustment value of the transmission timing of terminal station 3, to terminal station 3. Thus, base station 2 has terminal station 3 perform an adjustment of own transmission timing (step S105). In base station 2, transmission of the ranging command to terminal station 3 may be performed at any timing after the process of step S104. In addition, transmission of the ranging command to terminal station 3 may be performed at the timing of transmitting a command to terminal station 3, responding to the periodic ranging signal, which is periodically sent from terminal station 3.

Thereafter, base station 2 may shift its operation to a state of monitoring a necessity of the timing adjustment. The necessity of the timing adjustment may be determined based at least in part on the abnormality of the transmission power or the frequency in the periodical ranging processes (step S106).

<Additional Adjustment of the Transmission Timing at the Terminal Station after the Initial Ranging Process>

Figure 6A:
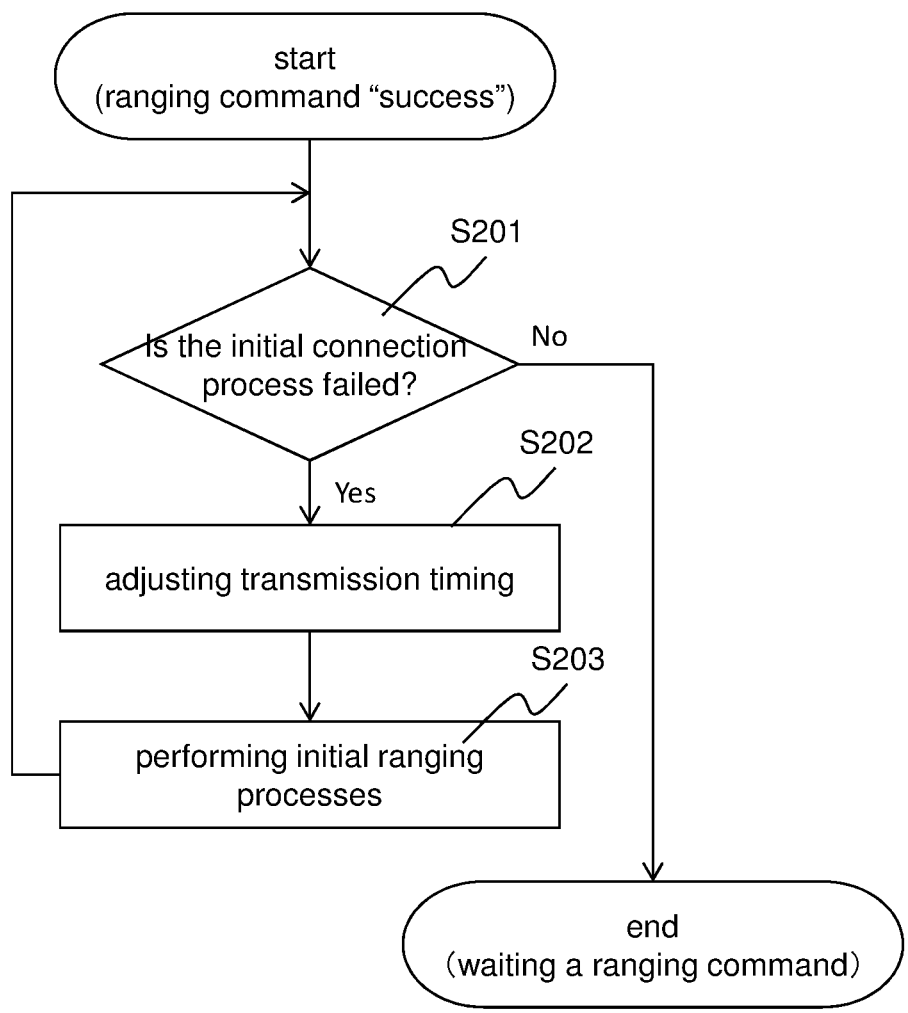
FIGS. 6A and 6B are flow diagrams of additional adjustment of timing by the terminal station after the initial ranging process.
Figure 6B:
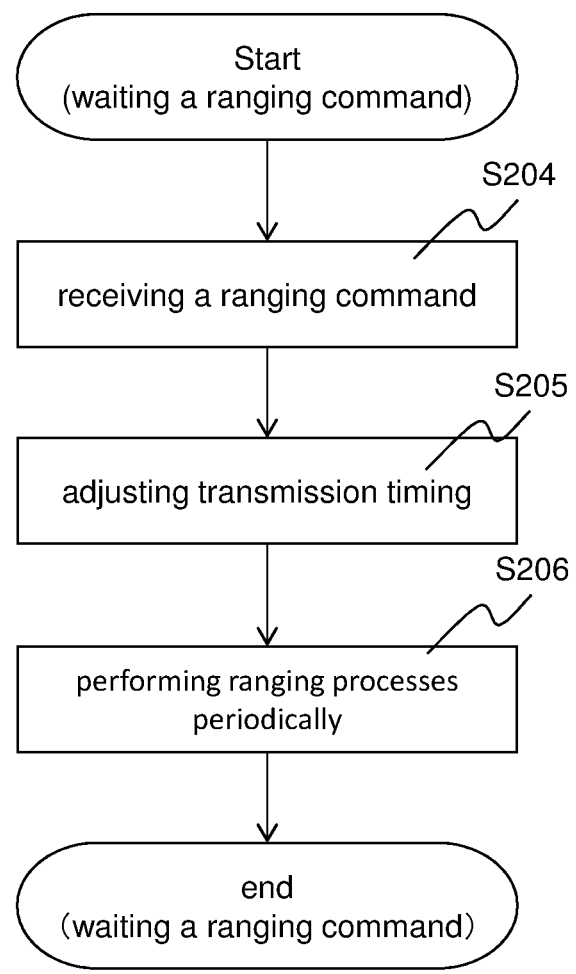

With reference to FIG. 6, we describe an additional adjustment of the transmission timing at terminal station 3 after the initial ranging process. Despite the fact that the process of the initial ranging exits with the status of "success", in a case that the distance between base station 2 and terminal station 3 exceeds the detection capability of the timing offset by referring to the ranging signal, inter-symbol interference may be occurred. Then, the communication for an initial connection process may be failed. Therefore, terminal station 3 in this example, in a case that the initial ranging process is completed as successful, in other words, when terminal station 3 was in a state of being success, terminal station 3 may perform an additional adjustment as follows.

The additional adjustment of the transmission timing at terminal station 3, after the initial ranging process, may be carried out by such as timing offset adjustor 308.

After the initial ranging process is completed as successful, terminal station 3 may determine the success or failure of the initial connection process (step S201). As an example, the success or failure of the initial connection process can be determined by the degree of inter-symbol interference or the reception quality. In this case, for example, when the degree of inter-symbol interference is no less than the specific threshold value, the initial connection process could be considered to be failure, and when the degree of inter-symbol interference is less than the specific threshold value, the initial connection process could be considered to be success. When the reception quality deteriorates so that error correcting is not possible, the initial connection process could be naturally considered to be failure.

In the step S201, when the initial connection process is determined to have failed, or, when the initial connection process is not completed within a prescribed time (in a case that a result of the determining step S201 is "Yes"), terminal station 3 may perform a re-adjustment of the transmission timing under the consideration that it is necessary to adjust the transmission timing additionally (step S202). The re-adjustment of the transmission timing may correspond to the adjustment so that the transmission timing is shifted forward for an integral multiple of the maximum detectable timing offset by referring to the ranging signal. In addition, the re-adjustment of the transmission timing may correspond to the adjustment so that the transmission timing is shifted forward for an integral multiple of the timing offset detection capability by the ranging signal. As an example, since a timing offset within 204.8 samples is distinguishable in IEEE 802.22, the transmission timing can be shifted forward in response to 204 samples by 204 samples, or in response to 205 samples by 205 samples. The calculation of the adjustment value of the timing offset may be based at least in part on a calculation that the value of an integral multiple is generated by adding the previous value of the integral multiple, to one by one, where the initial value of the integral multiple is one (1).

Terminal station 3 may transmit an initial ranging signal under the transmission timing adjusted in the step S202 (step S203).

Base station 2 may transmit a ranging command, indicated the status information of success ("success") to terminal station 3, because base station 2 cannot distinguish the difference between the offset for 204 samples and 205 samples. By repeating the process of step S201 to step S203, the transmission timing may be shifted forward until the initialization sequence (the initial connection process) is successful. As the initial connection process is successfully ended, the incomplete capability for detecting the timing offset of the ranging signal can be compensated.

In the step S201, when the initial connection process is determined to be successful (in a case that a result of the determining step S201 is "No"), terminal station 3 may shift its operation to the state, waiting a ranging command from base station 2. Terminal station 3 may be expecting for receiving an instruction of an additional adjustment. Terminal station 3 may perform a reception process for a ranging command, the reception process being corresponded to a transmission of a ranging command from base station 2 in the step S105 (step S204). When terminal station 3 receives the ranging command from base station 2, terminal station 3 may adjust the transmission timing according to the ranging command (step S205).

Thereafter, terminal station 3 may make a check of whether there is abnormality in the adjustment value under a periodic ranging process (step S206). Although, the periodic ranging process may be performed at the timing of a predetermined cycle as a conventional technology, it is preferable that the periodic ranging process starts without waiting for the timing in the predetermined cycle in order to confirm whether the processing of the timing adjustment is properly carried out.

By the above procedure, the adjustment of the transmission timing can perform appropriately and the interference with other terminal station 3 can be reduced, especially on condition that the long distance communication where the transmission timing cannot be adjusted appropriately by using a conventional ranging process, because the timing offset detection capability by referring to the ranging signal is incomplete.

<Other Examples of a Method for Adjusting Transmission Timing>

As another example of the method for adjusting the transmission timing in step S104, there is a method using a pilot symbol included in the signal transmitted from terminal station 3. A pilot symbol is generally used to estimate a channel response, or a condition of a transmission path. By processing a synchronous detection and restoring amplitude information under an equalization process, the pilot symbol is used for receiving a signal correctly. In the case of IEEE 802.22, the pilot symbols are arranged at every seven subcarriers. In a case that terminal station 3 is allowed transmission opportunities using all the resources (all subcarriers), ambiguities of the timing offset calculated by the ranging signal can be resolved.

As the relationship of the timing offset and the phase difference between subcarriers in the outputs of FFT, as described above, when the timing offset is one (1) sample, the phase difference of 7×2π/2048 radians is generated between the sub-carriers which are arranged 7 subcarriers away to each other. Therefore, when the phase difference between the pilot subcarriers in response to the FFT outputs is 0 radian, the timing offset can be calculated by the following formula (5).

$$\text{Offset} = \frac{2048\theta}{2\pi \times 7} \qquad \text{formula (5)}$$

In the case of the IEEE802.22, the phase difference φ (0) of the ranging sub-carriers generated by the offset corresponding to 0 sample, and the phase difference φ (204.8) between the pilot sub-carriers generated by the offset corresponding to 204.8 samples are represented by the following formulas (6).

$$\varphi(0) = \frac{2\pi \times 0}{2048} \times 10 = 0,$$

$$\varphi(204.8) = \frac{2\pi \times 204.8}{2048} \times 10 = 2\pi \qquad \text{formula (6)}$$

On the other hand, in the case of the IEEE802.22, the phase difference φ (0) of the pilot sub-carriers generated by the offset corresponding to 0 sample is represented by the following formula (7), and the phase difference φ (204.8) between the pilot sub-carriers, which are arranged 7 sub-carriers away to each other, generated by the offset corresponding to 204.8 samples are represented by the following formula (8).

$$\theta(0) = \frac{2\pi \times 0}{2048} \times 7 = 0 \qquad \text{formula (7)}$$

$$\theta(204.8) = \frac{2\pi \times 204.8}{2048} \times 7 = 2\pi \times \frac{1433.6}{2048} \qquad \text{formula (8)}$$

Thus, when the timing offsets cannot be distinguished due to the ambiguity under using the phase difference between the ranging sub-carriers only, the timing offsets can be distinguish by further utilizing the phase difference between the pilot subcarriers. That is, by utilizing the difference of the sub-carrier intervals, it is possible to resolve the ambiguity at the receiver of base station 2.

In a case that base station 2 determines that the initial ranging process has been completed as successful, but the initial connection process has been failed, in other words, although the initial ranging process is over successfully, but the base station determines that there might be a necessity for an additional adjustment of the transmission timing because the adjustment of the transmission timing is inadequate, base station 2 can compensate for the incomplete ability for detecting the timing offset by referring to the ranging signal. By calculating an adjusting value of the transmission timing on a basis of the pilot signals except ranging signals, the pilot signals being transmitted from terminal station 3 under a different interval from the interval of ranging signals, base station 2 can compensate for the incomplete ability for detecting the timing offset, which depended on the ranging signal.

The adjustment value which is calculated based on the pilot signals except ranging signals, may be an integral multiple of the maximum detectable timing offset, which depend on the ranging signal. In addition, the adjustment value may be an integral multiple of the timing offset detection capability of the ranging signal.

In a case that base station 2 cannot allocate transmission opportunities to terminal station 3 by using all available resources, base station 2 can calculate the adjustment value using the configuration illustrated in FIG. 10, if at least one set of pilot subcarrier signal is transmitted mutually under having an interval corresponding to seven (7) subcarrier signals, from terminal station 3.

As described above, the radio communication system of the present embodiment may include base station 2 and terminal station 3. Base station 2 may transmit an adjustment value of the transmission timing for terminal station 3, the adjustment value of the transmission timing may be calculated at least on a basis of a ranging signal transmitted from terminal station 3 to base station 2. Terminal station 3 may adjust its own transmission timing to base station 2, according to the adjustment value of the transmission timing, being transmitted from base station 2. In addition, when base station 2 determines that the adjustment of the transmission timing by referring to the ranging signals which are transmitted from terminal station 3 may become a state of success, base station 2 may further determine whether the adjustment of a transmission timing is appropriate or not. When the adjustment of the transmission timing is determined to be inappropriate, base station 2 has terminal station 3 adjust the transmission timing further by transmitting a calculated adjustment value for an additional adjustment to terminal station 3.

In this case, the adjustment value of the transmission timing for the additional adjustment may be an integral multiple of the timing offset detection capability by referring to the ranging signal. The transmission timing at terminal station 3 may become earlier corresponding to the adjustment value of the transmission timing. In other words, the transmission timing at terminal station 3 may be set ahead corresponding to the adjustment value of the transmission timing. As a result, the distance which can adjust the transmission timing by referring to the ranging signal can be thought as being extended by equal double.

Thus, in the wireless communication system of the present embodiment, although the adjustment of the transmission timing at terminal station 3 by referring to the ranging signal becomes successful state, in a case that the transmission timing at terminal station 3 has not properly adjusted actually, the transmission timing can be adjusted appropriately. Therefore, even when base station 2 and terminal station 3 are located far away so that ambiguities may be occurred in the process for detecting the timing offset by referring to a ranging signal, the transmission timing of terminal station 3 can be adjustable appropriately and interference with other terminal stations can be reduced.

For example, when base station 2 detects that the CINR being estimated from the pilot symbols which are embedded for the channel estimation is lower than the CINR being expected on a basis of a received power of the signal being transmitted from terminal station 3, in addition, for example, when the difference between these CINRs is equal to or larger than a specific threshold, base station 2 can determine that the adjustment of the transmission timing may be inadequate. Then, base station 2 may calculate an adjustment value so that the transmission timing may be set ahead an integral multiple of the timing offset detection capability, thereafter base station 2 may transmit a ranging command including the adjustment value.

Figure 15:
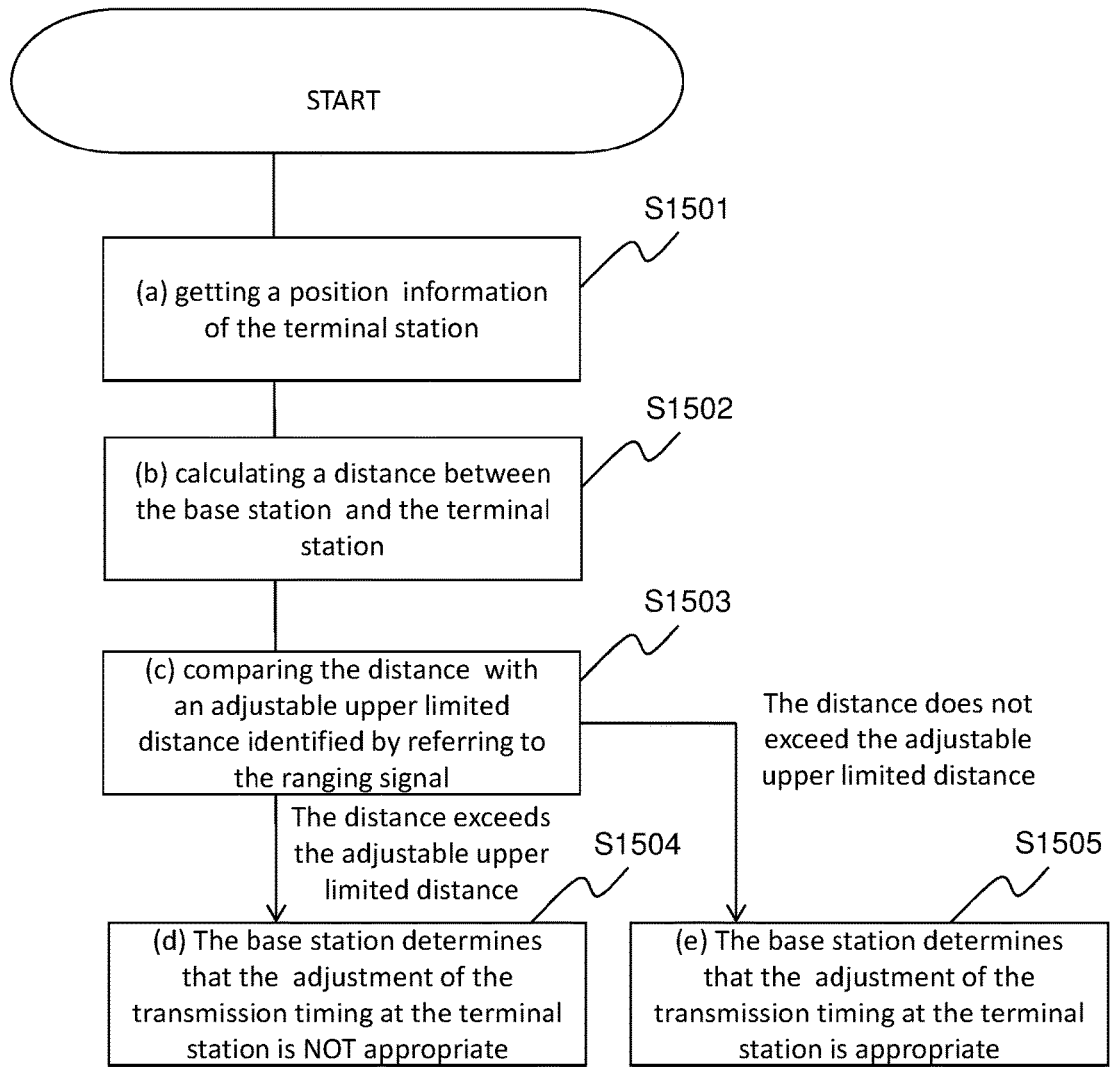
FIG. 15 is a flow diagram showing an example method for determining whether an adjustment of the transmission timing is appropriate.

As another example illustrated in FIG. 15, base station 2 may calculate a distance between base station 2 and terminal station 3 based at least in part on the position information which was notified from terminal station 3 at the process of establishing a connection with terminal station 3. When the calculated distance exceeds the adjustable upper limited distance identified by referring to the ranging signal, base station 2 can determine that the adjustment of the transmission timing is inappropriate. Then, base station 2 may calculate an adjustment value so that the transmission timing may be set ahead corresponding to a shortage of the timing offset detection capability of the ranging signal. Thereafter, base station 2 may transmit a ranging command including the adjustment value.

As another example, when base station 2 determines that the adjustment of the transmission timing at terminal station 3 is inappropriate, base station 2 may calculate the adjustment value at least on a basis of a reference signal except the ranging signal, the reference signal being transmitted from terminal station 3 to base station 2, so that the transmission timing at terminal station 3 is set ahead. An interval between two reference signals next to each other is different from the interval between two ranging signals next to each other. The pilot signal corresponds to the reference signal in this embodiment. Thereafter, base station 2 may transmit a ranging command including the adjustment value.

Incidentally, one of the methods for determining whether an adjustment of the transmission timing at terminal station 3 is appropriate or not, and one of the methods for calculating an adjustment value of the transmission timing for an additional adjustment can be put together optionally. A combination of a method for determining whether an adjustment of the transmission timing of terminal station 3 is appropriate or not, and a method for calculating an adjustment value of the transmission timing for an additional adjustment, is not limited to the combinations disclosed in the embodiments.

In the wireless communication system of the present embodiment, when terminal station 3 is informed that an adjustment of the transmission timing by referring to the ranging signal becomes a state of success, but the initial connection process between base station 2 and terminal station 3 is failed, terminal station 3 may repeat calculating a transmission timing adjustment value so as to set the transmission timing ahead corresponding to an integral multiple of the timing offset detection capability by referring to the ranging signal, and transmitting a ranging signal to base station 2 on a basis of the adjusted transmission timing until the initial connection process is completed as successful. This repeating process may be based at least in part on a calculation that the value of an integral multiple is generated by adding the previous value of the integral multiple, to one by one, where the initial value of the integral multiple is one (1).

Thus, since terminal station 3 may adjust the transmission timing by an integral multiple of the timing offset detection capability by referring to the ranging signal, until the initial connection process is completed as successful, the wireless communication system can compensate the lack of the timing offset detection capability by referring to the ranging signal.

For example, the present invention can provide by a method or an apparatus for performing a process according to the present invention, a program or an apparatus for executing the method, and a storage medium for storing the program. Further, the configuration of the system or the apparatus according to the present invention is not limited to those shown above, and various configurations may be used.

Figure 11:
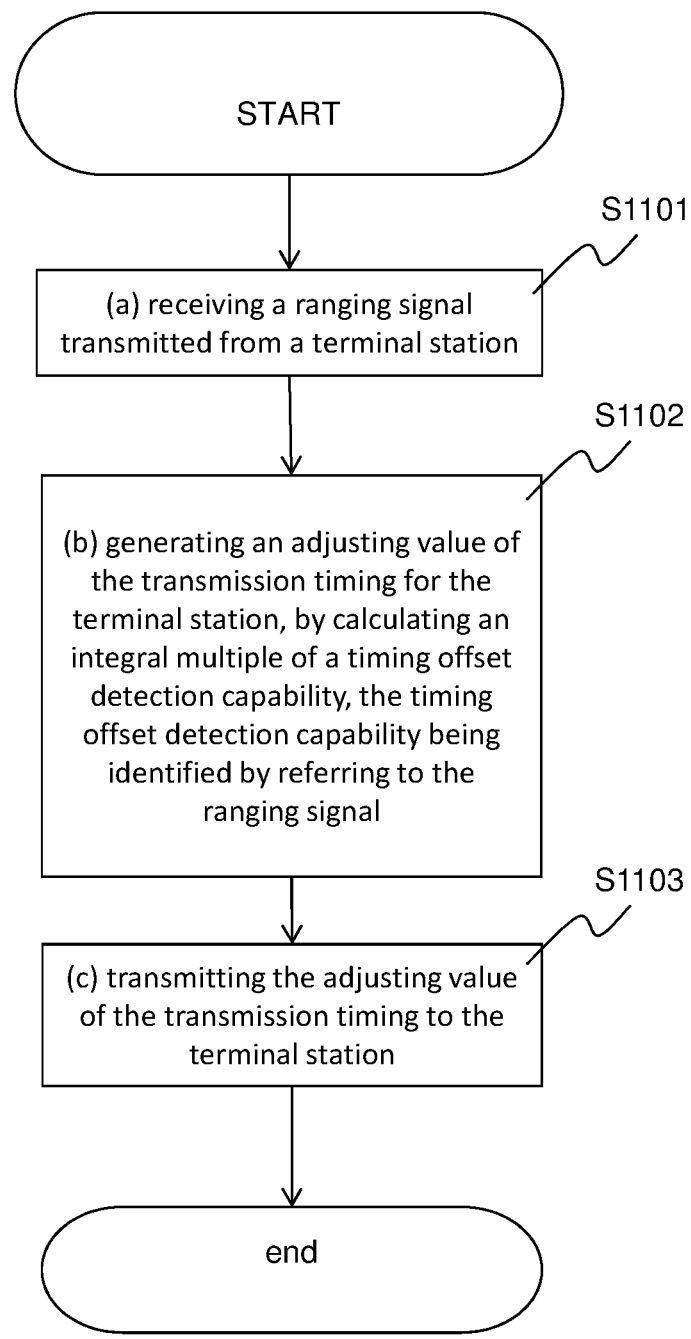
FIG. 11 is a flow diagram showing an example method for adjusting a transmission timing of a terminal station, the method being performed at a base station.

For example, FIG. 11 is a flow diagram showing an example method for adjusting a transmission timing of a terminal station, the method being performed at a base station in a multiple access system, the method comprising the steps of:

(a) receiving a ranging signal transmitted from a terminal station (step S1101);

(b) generating an adjusting value of the transmission timing for the terminal station, by calculating an integral multiple of a timing offset detection capability, the timing offset detection capability being identified by referring to the ranging signal (step S1102); and (c) transmitting the adjusting value of the transmission timing to the terminal station (step S1103).

Figure 12:
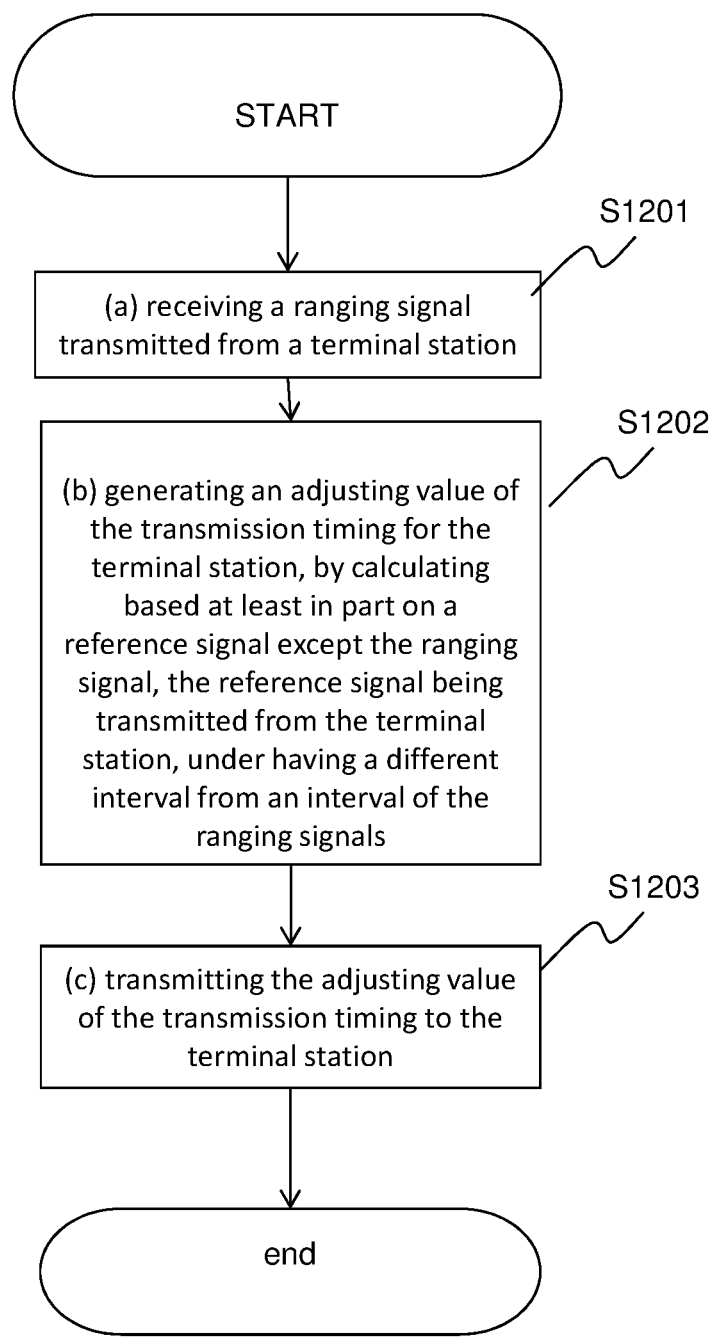
FIG. 12 is a flow diagram showing an example method for adjusting a transmission timing of a terminal station, the method being performed at a base station.

FIG. 12 is a flow diagram showing an example method for adjusting a transmission timing of a terminal station, the method being performed at a base station in a multiple access system, the method comprising the steps of:

(a) receiving a ranging signal transmitted from a terminal station (step S1201);

(b) generating an adjusting value of the transmission timing for the terminal station, by calculating based at least in part on a reference signal except the ranging signal, the reference signal being transmitted from the terminal station, under having a different interval from an interval of the ranging signals (step S1202); and (c) transmitting the adjusting value of the transmission timing to the terminal station (step S1203).

Figure 13:
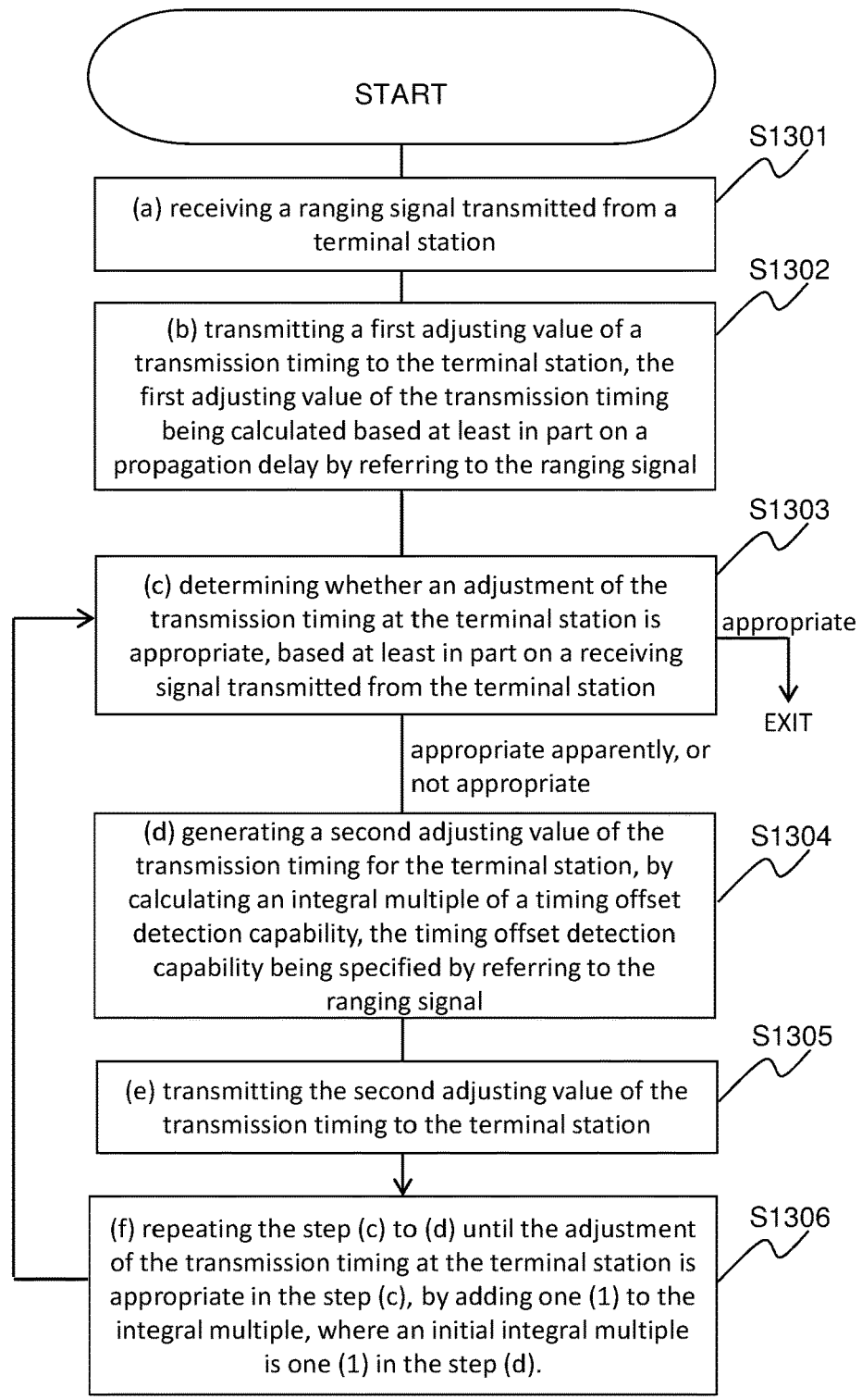
FIG. 13 is a flow diagram showing an example method for adjusting a transmission timing of a terminal station, the method being performed at a base station in Time-Division Duplex communication system.

FIG. 13 is a flow diagram showing an example method for adjusting a transmission timing of a terminal station, the method being performed at a base station in Time-Division Duplex communication system, the method comprising the steps of:

(a) receiving a ranging signal transmitted from a terminal station (step S1301);

(b) transmitting a first adjusting value of a transmission timing to the terminal station, the first adjusting value of the transmission timing being calculated based at least in part on a propagation delay by referring to the ranging signal (step S1302);

(c) determining whether an adjustment of the transmission timing at the terminal station is appropriate, based at least in part on a receiving signal transmitted from the terminal station (step S103);

When an adjustment of the transmission timing at the terminal station is appropriate apparently, or not appropriate, (d) generating a second adjusting value of the transmission timing for the terminal station, by calculating an integral multiple of a timing offset detection capability, the timing offset detection capability being specified by referring to the ranging signal (step S1304);

(e) transmitting the second adjusting value of the transmission timing to the terminal station (step S1305); and (f) repeating the step (c) to (d) until the adjustment of the transmission timing at the terminal station is appropriate in the step (c), by adding one (1) to the integral multiple, where an initial integral multiple is one (1) in the step (d).

Figure 14:
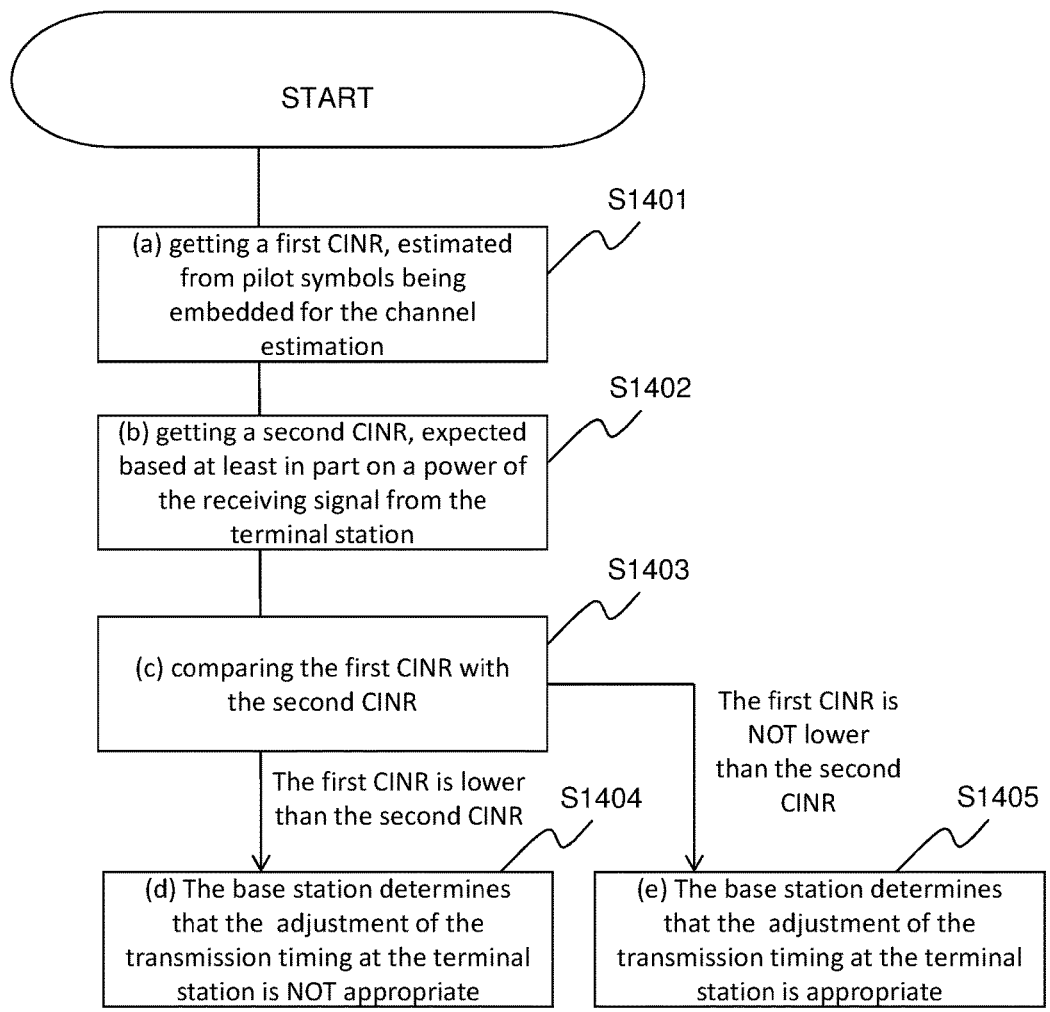
FIG. 14 is a flow diagram showing an example method for determining whether an adjustment of the transmission timing is appropriate.

FIG. 14 is a flow diagram showing an example method for determining whether an adjustment of the transmission timing is appropriate, the method comprising the steps of:

(a) getting a first Carrier-to-Interference and Noise Ratio (CINR), estimated from pilot symbols being embedded for the channel estimation (step S1401);
(b) getting a second Carrier-to-Interference and Noise Ratio (CINR), expected based at least in part on a power of the receiving signal from the terminal station (step S1402);
(c) comparing the first CINR with the second CINR (step S1403);
(d) When the first CINR is lower than the second CINR, the base station determines that the adjustment of the transmission timing at the terminal station is NOT appropriate; and
(e) When the first CINR is NOT lower than the second CINR, the base station determines that the adjustment of the transmission timing at the terminal station is appropriate.

FIG. 15 is a flow diagram showing an example method for determining whether an adjustment of the transmission timing is appropriate, the method comprising the steps of:
(a) getting a position information of the terminal station (step S1501);
(b) calculating a distance between the base station and the terminal station (step S1502);
(c) comparing the distance with an adjustable upper limited distance identified by referring to the ranging signal (step S1503);
(d) When the distance exceeds the adjustable upper limited distance, the base station determines that the adjustment of the transmission timing at the terminal station is NOT appropriate (step S1504); and
(e) When the distance does not exceed the adjustable upper limited distance, the base station determines that the adjustment of the transmission timing at the terminal station is appropriate (step S1505).

Figure 16:
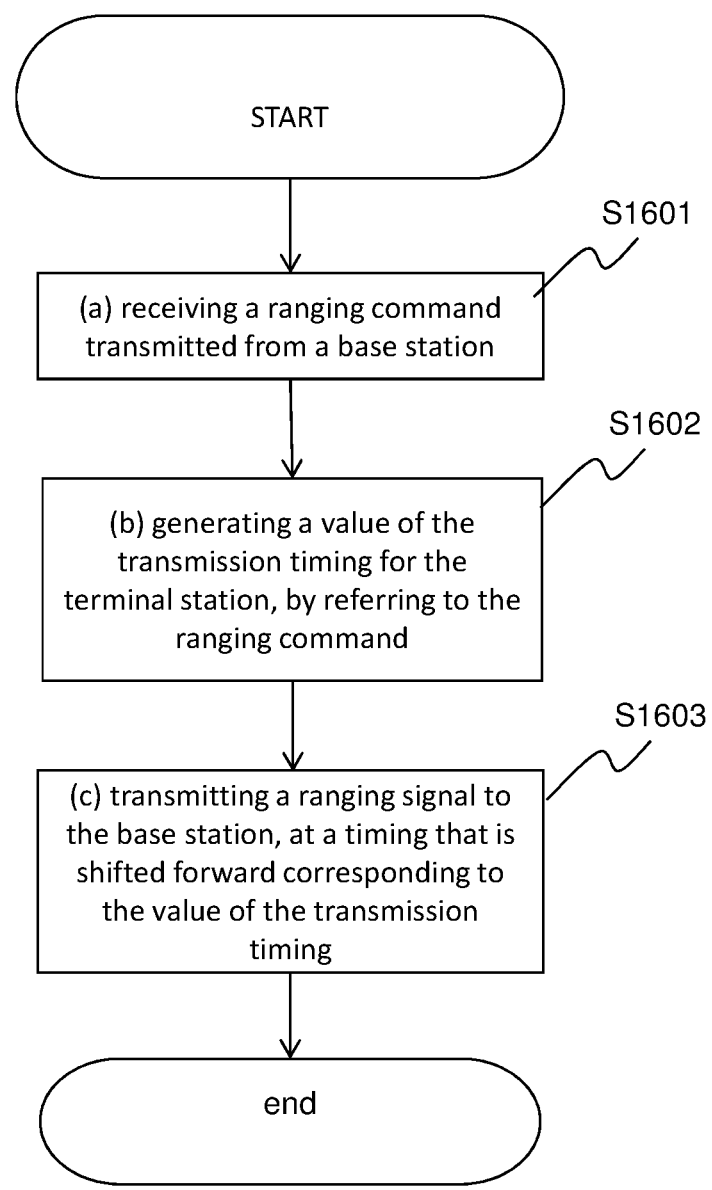
FIG. 16 is a flow diagram showing an example method for adjusting a transmission timing of a terminal station, the method being performed at a terminal station.

FIG. 16 is a flow diagram showing an example method for adjusting a transmission timing of a terminal station, the method being performed at a terminal station, the method comprising the steps of:
(a) receiving a ranging command transmitted from a base station (step S1601);
(b) generating a value of the transmission timing for the terminal station, by referring to the ranging command (step S1602); and
(c) transmitting a ranging signal to the base station, at a timing that is shifted forward corresponding to the value of the transmission timing (step S1603).

Figure 17:
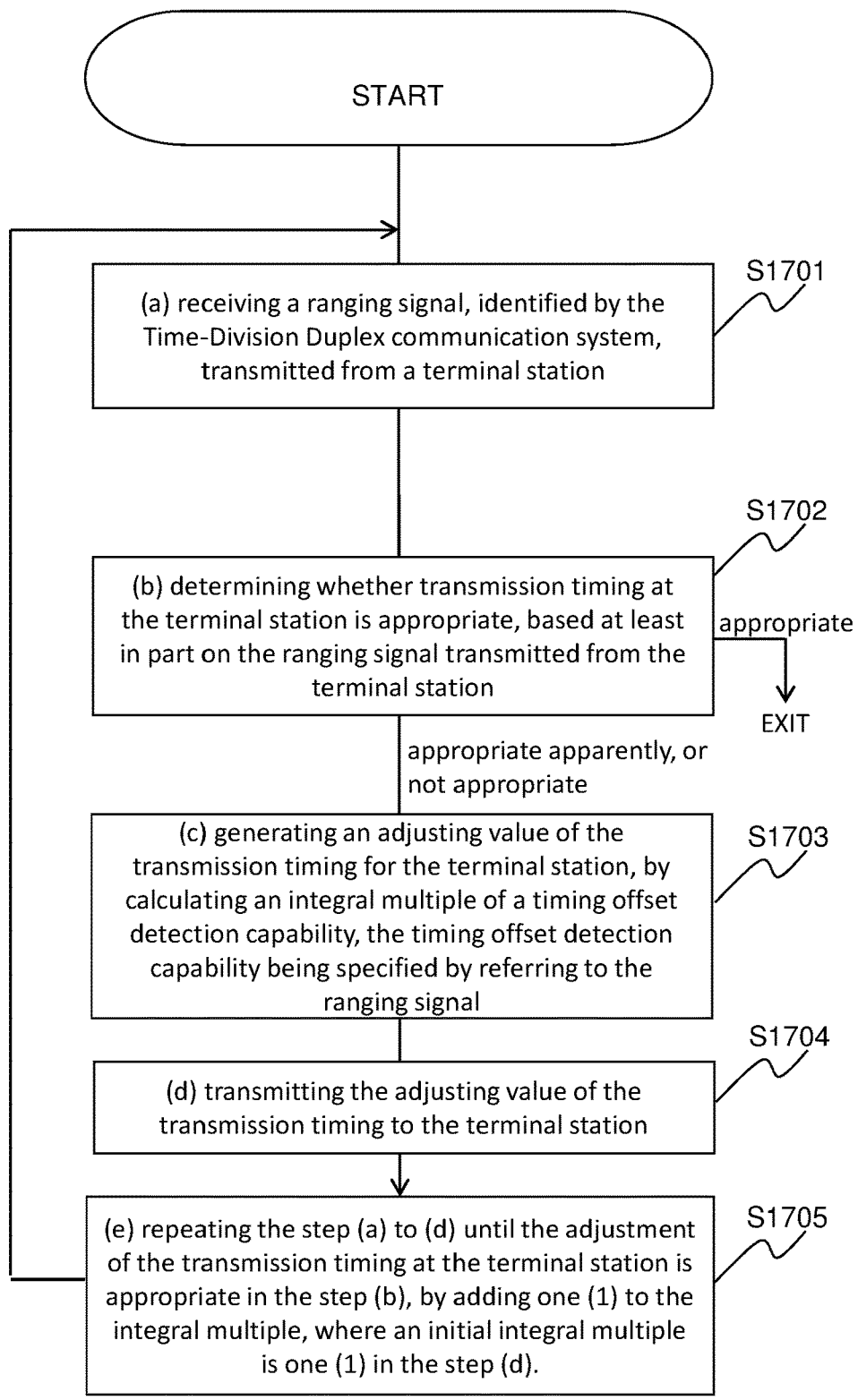
FIG. 17 is a flow diagram showing an example method for adjusting a transmission timing of a terminal station, the method being performed at a base station in Time-Division Duplex communication system.

FIG. 17 is a flow diagram showing an example method for adjusting a transmission timing of a terminal station, the method being performed at a base station in Time-Division Duplex communication system, the method comprising the steps of:
(a) receiving a ranging signal, identified by the Time-Division Duplex communication system, transmitted from a terminal station (step S1701);
(b) determining whether transmission timing at the terminal station is appropriate, based at least in part on the ranging signal transmitted from the terminal station (step S1702);
(c) generating an adjusting value of the transmission timing for the terminal station, by calculating an integral multiple of a timing offset detection capability, the timing offset detection capability being identified by referring to the ranging signal (step S1703);
(d) transmitting the adjusting value of the transmission timing to the terminal station (step S1704); and
(e) repeating the step (a) to (d) until the adjustment of the transmission timing at the terminal station is appropriate in the step (b), by adding one (1) to the integral multiple, where an initial integral multiple is one (1) in the step (c) (step S1705).

Figure 18:
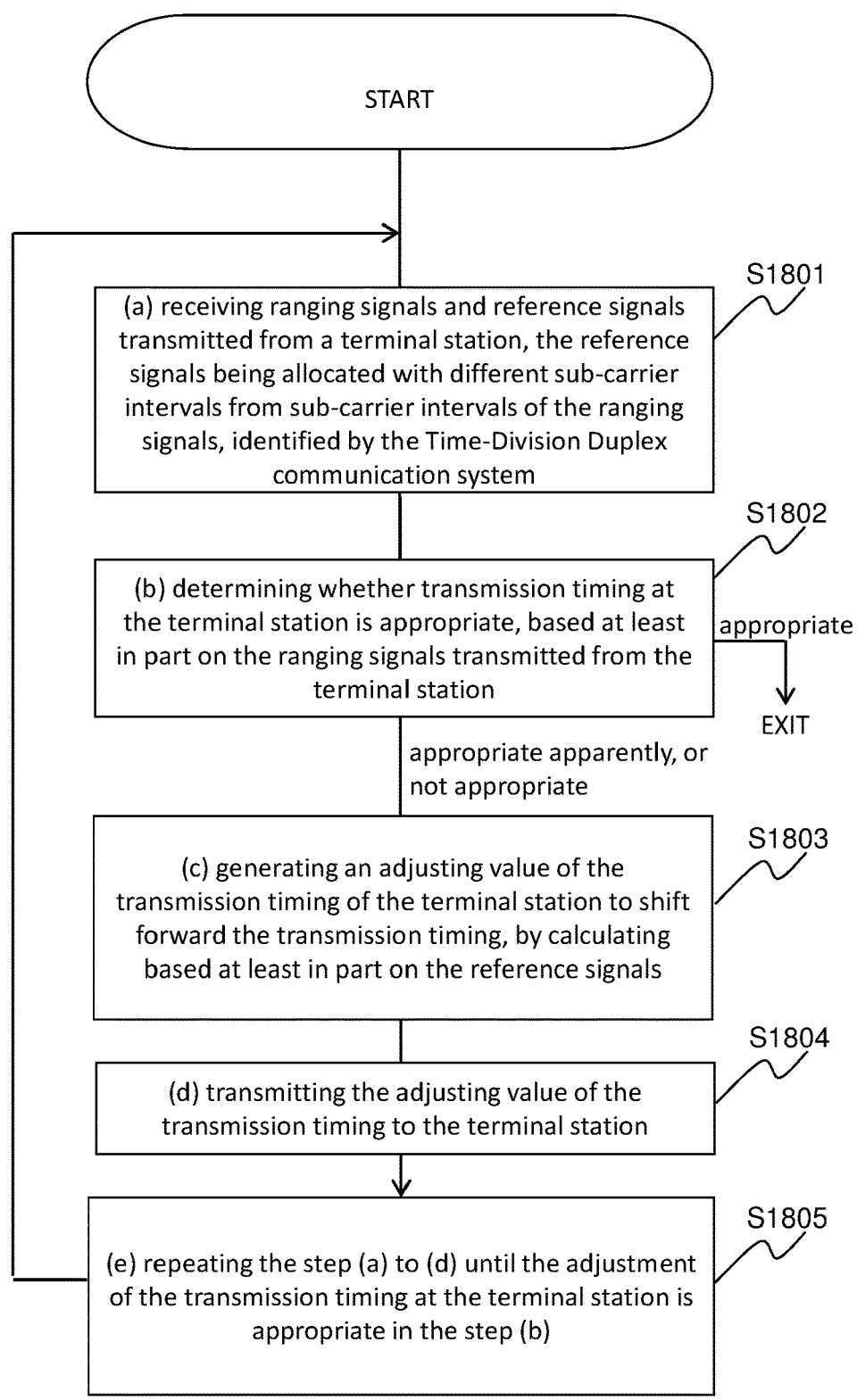
FIG. 18 is a flow diagram showing an example method for adjusting a transmission timing of a terminal station, the method being performed at a base station in Time-Division Duplex communication system.

FIG. 18 is a flow diagram showing an example method for adjusting a transmission timing of a terminal station, the method being performed at a base station in Time-Division Duplex communication system, the method comprising the steps of:
(a) receiving ranging signals and reference signals transmitted from a terminal station, the reference signals being allocated with different sub-carrier intervals from sub-carrier intervals of the ranging signals, identified by the Time-Division Duplex communication system (step S1801);
(b) determining whether transmission timing at the terminal station is appropriate, based at least in part on the ranging signals transmitted from the terminal station (step S1802);
(c) generating a adjusting value of the transmission timing of the terminal station to shift forward the transmission timing, by calculating based at least in part on the reference signals (step S1803);
(d) transmitting the adjusting value of the transmission timing to the terminal station (step S1804); and
(e) repeating the step (a) to (d) until the adjustment of the transmission timing at the terminal station is appropriate in the step (b) (step S1805).

INDUSTRIAL APPLICABILITY

The present invention is applicable to a wireless or wired two-way communication system or an access system, the wireless or wired two-way communication system or the access system adjusting a transmission timing of a terminal station using ranging signals.

DESCRIPTION OF THE REFERENCE CODE

2: base station, 3: terminal station, 201: antenna, 202: RF section, 203: BB signal processor, 204: MAC processor, 205: main controller, 206: interface section, 207: external network connector, 208: timing offset adjustor, 209: timing offset estimator, 301: antenna, 302: RF section, 303: BB signal processor, 304: MAC processor, 305: main controller, 306: interface section, 307: external network connector, 308: timing offset adjustor

What is claimed is:
1. A method for adjusting a transmission timing at a terminal station, being performed at a base station in a Time-Division Duplex communication system, the method comprising steps of:
(a) receiving a ranging signal, identified by the Time-Division Duplex communication system, transmitted from the terminal station;
(b) determining whether the transmission timing at the terminal station is appropriate based at least in part on one of: the ranging signal transmitted from the terminal station or an adjustment of the transmission timing at the terminal station,
wherein in the step (b), in a case that a Carrier-to-Interference and Noise Ratio (CINR) estimated from pilot symbols being embedded for a channel estimation is lower than a CINR expected based at least in part on a power of a receiving signal from the terminal station, the base station determines that the adjustment of the transmission timing at the terminal station is not appropriate;
(c) in response to the determination that the transmission timing at the terminal station is not appropriate, generating an adjusting value of the transmission timing for the terminal station by calculating an integral mul- tiple of a timing offset detection capability, the timing offset detection capability being identified by referring to the ranging signal;
(d) transmitting the adjusting value of the transmission timing to the terminal station; and
(e) repeating the steps (a) to (d) until an adjustment of the transmission timing at the terminal station is appropriate in the step (b), by adding one to the integral multiple, wherein an initial integral multiple is one in the step (c).

2. A method for adjusting a transmission timing at a terminal station, being performed at a base station in a Time-Division Duplex communication system, the method comprising steps of:
(a) receiving ranging signals and reference signals transmitted from the terminal station, the reference signals being allocated with different sub-carrier intervals from sub-carrier intervals of the ranging signals, identified by the Time-Division Duplex communication system;
(b) determining whether the transmission timing at the terminal station is appropriate based at least in part on one of: the ranging signals transmitted from the terminal station or an adjustment of the transmission timing at the terminal station,
wherein in the step (b), in a case that a Carrier-to-Interference and Noise Ratio (CINR) estimated from pilot symbols being embedded for a channel estimation is lower than a CINR expected based at least in part on a power of a receiving signal from the terminal station, the base station determines that the adjustment of the transmission timing at the terminal station is not appropriate;
(c) in response to the determination that the transmission timing at the terminal station is not appropriate, generating an adjusting value of the transmission timing of the terminal station to shift forward the transmission timing, by calculating based at least in part on the reference signals;
(d) transmitting the adjusting value of the transmission timing to the terminal station; and
(e) repeating the steps (a) to (d) until an adjustment of the transmission timing at the terminal station is appropriate in the step (b).

3. The method according to claim 2, wherein the reference signals are pilot signals in the Time-Division Duplex communication system.

4. A method for adjusting a transmission timing at a terminal station, being performed between a base station and the terminal station in a multiple access system, the method comprising steps of:
(a) transmitting, by the terminal station, ranging signals to the base station, the ranging signals being allocated to sub-carriers with an interval in Orthogonal Frequency Division Multiplexing Modulation (OFDM) symbols;
(b) receiving, by the base station, the ranging signals transmitted from the terminal station;
(c) determining, by the base station, whether an adjustment of the transmission timing at the terminal station is appropriate based at least in part on a receiving signal transmitted from the terminal station,
wherein in the step (c), in a case that a Carrier-to-Interference and Noise Ratio (CINR) estimated from pilot symbols being embedded for a channel estimation is lower than a CINR expected based at least in part on a power of the receiving signal from the terminal station, the base station determines that the adjustment of the transmission timing at the terminal station is not appropriate;
(d) in response to the determination that the adjustment of the transmission timing at the terminal station is not appropriate, generating, by the base station, an adjusting value of the transmission timing for the terminal station, by calculating an integral multiple of a timing offset detection capability, the timing offset detection capability being identified by referring to a ranging signal;
(e) transmitting, by the base station, the adjusting value of the transmission timing to the terminal station;
(f) receiving, by the terminal station, the adjusting value of the transmission timing;
(g) transmitting, by the terminal station, another ranging signal to the base station, at a timing that is shifted forward corresponding to the adjusting value of the transmission timing;
(h) repeating the steps (a) to (g) until an adjustment of the transmission timing at the terminal station is appropriate in the step (c), by adding one to the integral multiple, wherein an initial integral multiple is one in the step (d).

* * * * *